(12) United States Patent
Shirazi et al.

(10) Patent No.: US 10,190,058 B2
(45) Date of Patent: Jan. 29, 2019

(54) HIGH-YIELD PRODUCTION OF FUELS AND PETRO- AND OLEO-CHEMICAL PRECURSORS FROM VEGETABLE OILS AND OTHER LIQUID FEEDSTOCKS IN A CONTINUOUS-FLOW PYROLYSIS REACTOR WITH OR WITHOUT CATALYSTS

(71) Applicant: The University of Toledo, Toledo, OH (US)

(72) Inventors: Yaser Shirazi, Toledo, OH (US); Sridhar Viamajala, Toledo, OH (US); Sasidhar Varanasi, Toledo, OH (US)

(73) Assignee: The University of Toledo, Toledo, OH (US)

( * ) Notice: Subject to any disclaimer, the term of this patent is extended or adjusted under 35 U.S.C. 154(b) by 0 days.

(21) Appl. No.: 15/682,023

(22) Filed: Aug. 21, 2017

(65) Prior Publication Data
US 2018/0051214 A1 Feb. 22, 2018

Related U.S. Application Data

(60) Provisional application No. 62/377,958, filed on Aug. 22, 2016.

(51) Int. Cl.
*C10G 3/00* (2006.01)
*C11C 1/02* (2006.01)
*C11C 3/00* (2006.01)
*C11C 1/00* (2006.01)

(52) U.S. Cl.
CPC .............. *C10G 3/40* (2013.01); *C10G 3/42* (2013.01); *C11C 1/00* (2013.01); *C11C 1/02* (2013.01); *C11C 3/00* (2013.01); *C10G 2300/1014* (2013.01); *C10G 2300/202* (2013.01); *C10G 2400/02* (2013.01); *C10G 2400/08* (2013.01); *C10G 2400/30* (2013.01)

(58) Field of Classification Search
CPC .... C10G 3/40; C10G 3/42; C10G 2300/1014; C10G 2300/202; C11C 1/02; C11C 3/00
See application file for complete search history.

(56) References Cited

U.S. PATENT DOCUMENTS

| | | | | |
|---|---|---|---|---|
| 2,917,370 A | * | 12/1959 | Edminster | C09C 1/50 261/114.1 |
| 3,795,713 A | * | 3/1974 | Washimi et al. | C10G 9/00 208/106 |
| 8,961,743 B2 | * | 2/2015 | Freel | C10B 49/22 202/108 |

OTHER PUBLICATIONS

Dandik, L., et al., Catalytic conversion of used oil to hydrocarbon fuels in a fractionating pyrolysis reactor, 1998, Energy & Fuels, vol. 12, No. 6, pp. 1148-1152 (Year: 1998).*
Shirazi, Y., et al., High-yield production of fuel- and oleochemical-precursors from triacylglycerols in a novel continuous-flow pyrolysis reactor, Jul. 19, 2016, Applied Energy, vol. 179, pp. 755-764 (Year: 2016).*

* cited by examiner

*Primary Examiner* — Yate' K Cutliff
(74) *Attorney, Agent, or Firm* — MacMillan, Sobanski & Todd, LLC

(57) ABSTRACT

Systems, methods, and materials for pyrolyzing vegetable oil feedstocks to obtain high yields of various products are described.

17 Claims, 28 Drawing Sheets
(18 of 28 Drawing Sheet(s) Filed in Color)

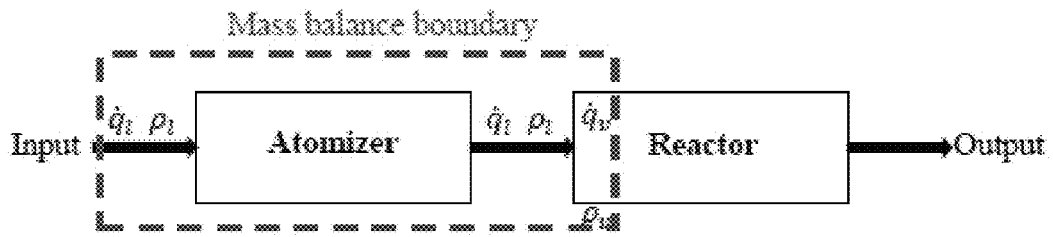

From equation of continuity $\Rightarrow$ $\dot{q}_l \cdot \rho_l = \dot{q}_v \cdot \rho_v$ From Ideal Gas Law $\Rightarrow$ $\rho_v = \dfrac{P\,M_w}{RT}$ And; $\dot{m} = \dot{q}_l \cdot \rho_l$ ; $\dot{q}_v = \dfrac{LA}{\tau}$ Therefore, $\dot{m} = \dfrac{LA}{\tau} \cdot \dfrac{P\,M_w}{RT}$

FIG. 6

| Compound | Experimental condition | | | | | |
|---|---|---|---|---|---|---|
| | 450-60 | 450-300 | 475-60 | 475-300 | 500-60 | 500-300 |
| Palmitic acid | 4.0 | 4.3 | 4.5 | 5.8 | 5.5 | 5.2 |
| Linoleic acid | 7.3 | 6.2 | 5.1 | 3.5 | 5.3 | 4.9 |
| Oleic acid | 22.3 | 20.3 | 21.5 | 17.7 | 18.1 | 15.5 |
| Stearic acid | 4.8 | 4.8 | 4.1 | 4.1 | 4.5 | 3.9 |
| Total | 38.4 | 35.7 | 35.2 | 31.2 | 33.2 | 29.5 |

FIG. 7 – Table 1

| Compound | Experimental condition | | | | | |
|---|---|---|---|---|---|---|
| | 450-60 | 450-300 | 475-60 | 475-300 | 500-60 | 500-300 |
| Hexanoic acid | 0.7 | 1.0 | 1.4 | 1.9 | 1.1 | 1.1 |
| Heptanoic acid | 1.9 | 2.9 | 3.4 | 3.2 | 3.7 | 4.7 |
| Octanoic acid | 1.0 | 1.8 | 1.5 | 2.2 | 1.7 | 1.8 |
| Nonanoic acid | 1.1 | 1.5 | 1.4 | 2.0 | 1.3 | 1.3 |
| Decenoic acid | 1.6 | 1.9 | 2.0 | 1.7 | 2.7 | 2.2 |
| Decanoic acid | 1.4 | 2.4 | 2.1 | 2.7 | 2.6 | 2.9 |
| Undecenoic acid | 0.6 | 0.8 | 0.9 | 0.7 | 1.1 | 1.1 |
| Decanedioic acid | 1.0 | 0.5 | 0.5 | 0.5 | 0.8 | 0.8 |
| Total | 9.2 | 12.7 | 13.2 | 14.8 | 15.0 | 16.0 |

FIG. 8 – Table 2

| Experimental condition | Composition of recovered liquid (wt. % of feed) | | | | | | Gas |
|---|---|---|---|---|---|---|---|
| | Unreacted feed | L-FAs ($C_{15}$-$C_{16}$) | S-FAs ($C_6$-$C_{12}$) | Li-HCs ($C_5$-$C_{12}$) | Hy-HCs (>$C_{12}$) | Unidentified liquid products | |
| 450-1 | 55.9 | 26.3 | 2.2 | 2.9 | 3.6 | 2.3 | 6.8 |
| 450-6 | 17.0 | 40.1 | 4.1 | 5.5 | 5.0 | 20.4 | 8.0 |
| 450-60 | 5.7 | 34.6 | 8.3 | 11.3 | 9.0 | 21.3 | 9.7 |
| 450-300 | 0.0 | 31.9 | 11.1 | 16.3 | 6.8 | 21.7 | 13.1 |
| 475-1 | 45.0 | 28.6 | 4.0 | 4.9 | 4.9 | 4.4 | 8.2 |
| 475-6 | 7.2 | 36.9 | 6.3 | 8.0 | 7.6 | 24.2 | 9.8 |
| 475-60 | 0.0 | 30.9 | 11.6 | 15.6 | 13.3 | 16.3 | 12.3 |
| 475-300 | 0.0 | 23.6 | 11.2 | 19.3 | 8.1 | 13.4 | 24.4 |
| 500-1 | 36.8 | 29.4 | 5.8 | 5.5 | 6.1 | 5.0 | 11.5 |
| 500-6 | 2.8 | 36.3 | 7.3 | 9.6 | 8.7 | 22.6 | 12.8 |
| 500-60 | 0.0 | 28.3 | 12.8 | 19.0 | 13.8 | 11.3 | 14.7 |
| 500-300 | 0.0 | 20.6 | 11.2 | 19.8 | 8.9 | 9.5 | 30.1 |
| 550-300 | 0.0 | 5.2 | 6.2 | 23.1 | 4.3 | 10.5 | 50.8 |

FIG. 9 – Table 3

FIG. 11 – Table 4

| Peak No. | RT (min) | Compound | Relative GC-FID (%) |
|---|---|---|---|
| 1 | 3.11 | 1-pentene | 0.26 |
| 2 | 3.81 | pentane | 2.57 |
| 3 | 4.13 | 2-pentene | 1.00 |
| 4 | 4.71 | cyclopentene | 1.02 |
| 5 | 5.44 | methylpentene | 1.40 |
| 6 | 6.09 | hexene | 4.62 |
| 7 | 6.83 | hexane | 3.14 |
| 8 | 9.68 | benzene | 0.71 |
| 9 | 11.53 | cyclopentane methylene | 2.38 |
| 10 | 12.95 | 1-heptene | 4.18 |
| 11 | 14.11 | heptane | 2.45 |
| 12 | 15.68 | 3-heptene | 0.44 |
| 13 | 20.61 | toluene | 1.43 |
| 14 | 24.34 | octadiene | 0.67 |
| 15 | 26.12 | 1-octene | 2.13 |
| 16 | 27.98 | octane | 2.67 |
| 17 | 29.81 | 2-octene | 0.74 |
| 18 | 30.85 | cyclooctane | 0.80 |
| 19 | 33.13 | ethylbenzene | 1.23 |
| 20 | 36.85 | m-xylene | 0.47 |
| 21 | 40.61 | p-xylene | 0.78 |
| 22 | 42.16 | o-xylene | 4.21 |
| 23 | 43.88 | cyclononene | 1.73 |
| 24 | 44.29 | 1-nonene | 0.26 |
| 25 | 44.42 | 3-nonene | 1.87 |
| 26 | 45.00 | nonane | 0.89 |
| 27 | 46.98 | isopropylbenzene | 0.88 |
| 28 | 53.33 | n-propylbenzene | |

| Peak No. | RT (min) | Compound | Relative GC-FID (%) |
|---|---|---|---|
| 30 | 55.46 | 1-methyl-2-ethylbenzene | 0.32 |
| 31 | 58.36 | 1-methyl-4-ethylbenzene | 0.18 |
| 32 | 58.35 | trimethylbenzene | 0.17 |
| 33 | 60.13 | 1-methyl-2-ethylbenzene | 0.50 |
| 34 | 64.14 | tert-butylbenzene | 1.11 |
| 35 | 67.32 | decene | 1.60 |
| 36 | 69.21 | decane | 0.43 |
| 37 | 70.24 | methyl-isopropylbenzene | 1.35 |
| 38 | 73.50 | n-propylbenzene | 1.88 |
| 39 | 82.18 | undecene | 1.17 |
| 40 | 82.28 | decane | 0.71 |
| 41 | 84.64 | 2-undecene | 1.73 |
| 42 | 85.34 | undecane | 2.19 |
| 43 | 87.35 | benzene pentyl | 1.29 |
| 44 | 89.65 | butylcycloheptadiene | 2.61 |
| 45 | 91.73 | dodecene | 1.65 |
| 46 | 93.23 | dodecane | 1.06 |
| 47 | 94.43 | dodecadiene | 0.49 |
| 48 | 96.92 | benzenehexyl | 1.81 |
| 49 | 99.82 | tridecene | 1.24 |
| 50 | 101.25 | tridecane | 0.98 |
| 51 | 104.69 | tridecadiene | 0.78 |
| 52 | 107.62 | tetradecene | 1.13 |
| 53 | 108.36 | tetradecane | 2.92 |
| 54 | 112.98 | pentadecene | 2.99 |
| 55 | 114.35 | pentadecane | 3.44 |
| 56 | 114.61 | hexadecene | 0.26 |
| 57 | 120.35 | hexadecane | 1.70 |
| 58 | 123.22 | heptadecane | 1.20 |
| 59 | 124.68 | Total | 83.3 |

| Peak No. | Compounds | Relative GC-FID (%) |
|---|---|---|
| 1 | C13-HCs | 2.4 |
| 2 | C15-HCs | 5.6 |
| 3 | C16-HCs | 0.7 |
| 4 | C17-HCs | 3.1 |
| 5 | C16-FAs | 9.2 |
| 6 | C18-FAs | 59.2 |
| | Total identified | 80.3 |

FIG. 13 – Table 6

| RT (min) | S-FAs | $DF^a$ (wt. %) | $RF^b$ (wt. %) |
|---|---|---|---|
| 46 | $C_6$ | 0.8 | 0.4 |
| 70 | $C_7$ | 3.0 | 1.2 |
| 84 | $C_8$ | 1.3 | 0.7 |
| 93.5 | $C_9$ | 0.9 | 0.5 |
| 101.5 | $C_{10}$ | 0.7 | 5.4 |
| 108 | $C_{11}$ | - | 0.6 |
| | Total | 6.7 | 8.8 | a: Values are relative to DF.
b: Values are relative to RF.

FIG. 15 – Table 7

| Peak No. | Compound | Feed | 450-60 | 450-300 |
|---|---|---|---|---|
| 1 | Decanoic acid | 0.0 | 1.1 | 4.3 |
| 2 | Heptadecene | 0.0 | 2.9 | 5.7 |
| 3 | Tetradecanoic acid | 2.7 | 2.5 | 2.3 |
| 4 | Hexadecenoic acid | 3.3 | 3.1 | 2.9 |
| 5 | Hexadecanoic acid | 4.4 | 4.2 | 4.3 |
| 6 | Heptadecanoic acid | 1.9 | 1.5 | 1.3 |
| 7 | Oleic acid | 85.5 | 72.4 | 63.3 |
| | Total | 97.7 | 87.7 | 84.1 |

FIG. 17 – Table 8

HIGH-YIELD PRODUCTION OF FUELS AND PETRO- AND OLEO-CHEMICAL PRECURSORS FROM VEGETABLE OILS AND OTHER LIQUID FEEDSTOCKS IN A CONTINUOUS-FLOW PYROLYSIS REACTOR WITH OR WITHOUT CATALYSTS

RELATED APPLICATIONS

This application claims priority to U.S. Provisional Application No. 62/377,958, filed under 35 U.S.C. § 111(b) on Aug. 22, 2016, the entire disclosure of which is expressly incorporated herein by reference for all purposes.

STATEMENT REGARDING FEDERALLY SPONSORED RESEARCH

This invention was made with government support under Grant Number DE-EE0005993 awarded by the U.S. Department of Energy, and Grant Number CHE1230609 awarded by the National Science Foundation. The government has certain rights in this invention.

BACKGROUND OF THE INVENTION

Energy-dense triglycerides from oil seeds or microalgae have the potential to at least partially displace petroleum-derived fuels. However, triglycerides cannot be used directly in current combustion engines due to their low volatility and high viscosity. Vegetable oils, the primary source of triglycerides that are currently used for biofuel production, are typically converted to usable fuels through transesterification. In this process, triglycerides react with methanol, usually in the presence of a homogenous catalyst (e.g. sodium hydroxide or methoxide), to produce a mixture of fatty acid methyl esters (FAMEs; commonly known as biodiesel). Since the transesterification reaction is reversible, excess alcohol is required to shift the reaction towards ester production; thus, unreacted alcohol along with catalyst and glycerol need to be separated and recovered at the end of the reaction. Also, the presence of free fatty acids in the feedstock leads to saponification, which results in the loss of catalyst and a decrease in the yield of esters. Finally, while biodiesel is compatible with petro diesel, it exhibits a relatively high melting point (which limits its usage in cold climate regions) and lower oxidative stability compared to diesel.

As an alternative, pyrolysis (thermal cracking in the absence of $O_2$) of vegetable oil can produce hydrocarbons that are compatible with a variety of petro-fuels such as gasoline, jet, and diesel. Studies on pyrolysis of seed oils, such as canola, palm, and soybean oil, reveal that the primary compounds in the product are paraffins, olefins, carboxylic acids, and small amounts of aromatics. Although a mixture is produced, the pyrolysis products can be separated (e.g., using distillation) and used either directly or processed by common refinery methods such as hydrogenation, hydrotreatment, or alkylation to obtain gasoline- and/or diesel-like fuels. Further, unlike transesterification, conversion of triglycerides by pyrolysis avoids the use of methanol and unrecoverable homogenous catalysts. In addition, the un-degraded long chain fatty acids from pyrolysis (e.g. oleic acid) can be separated from hydrocarbons to serve as feedstock for oleochemical production.

Pyrolysis of vegetable oils has typically been carried out in batch reactors at a temperature range of 300-500° C. and atmospheric pressure. However, batch processes are not appropriate for commodity scale industrial operations due to low throughput. In addition, most batch studies report low yield of liquid products, likely due to the high residence time in these closed systems which allows secondary reactions of primary products to low molecular weight ($C_1$-$C_4$) noncondensable gases. For example, batch pyrolysis of tung oil has been conducted at 450° C. and a residence time of 100 min, and the result was only 55% yield of liquid products. Batch pyrolysis of canola and soybean oil at 440° C. has also been conducted, but at a lower residence time of 10 min and also with high hydrogen pressure (2200 kPa). This approach resulted in higher organic liquid product (OLP) yields (67% OLP for soybean oil and 61-69% for canola oil), likely due to the shorter reaction time and in situ hydrogenation of unsaturated primary products that lowered the production of secondary noncondensable gases.

Others have attempted pyrolyzing vegetable oil in continuous flow reactors. However, due to high reaction residence time, low yield of liquid products has been reported from these attempts. In some cases, carrier gas was used to decrease the residence time. However, carrier gas usage increases operating (i.e., cost associated with supplying and heating the carrier gas) and capital (i.e., larger reactor and condenser) costs.

For example, thermal cracking of canola oil has been performed in an effort to develop a continuous process for vegetable oil pyrolysis. The reactor consisted of a fixed-bed of inert materials (ceramic and quartz glass chips) that was kept at 500° C. Due to the high reactor temperature and surface area created by inert particles, feed likely vaporized and cracked simultaneously. However, the residence time was still high (18 min) and only 15% of feed was recovered as OLP. Nearly 75% of feed was lost as uncondensed gases such as small chain hydrocarbons ($C_1$-$C_4$) and $H_2$.

Without wishing to be bound by theory, OLP yields from vegetable oils are understood to be better in continuous reactors with low residence times, since secondary reactions are generally minimized due to continuous product removal and condensation, similar to the fast pyrolysis of solid substrates (e.g., biomass and coal), which are carried out at high temperature and short residence time to maximize liquid products. Theoretical reaction mechanisms also indicate that liquid formation would be more favorable at low residence time. Some have explored this approach and have reported improved liquid product yields. For instance, in previously reported continuous pyrolysis of waste fish oil a relatively high yield of 72% liquid products was observed at reaction temperature of 525° C. and low vapor residence time of 24 s. In addition to short residence time, a high free fatty acid content in the feed also possibly contributed to the high yields of OLP since fatty acids are more amenable to thermal cracking than triglycerides. However, while yields were improved, nearly 30% of feed material was still lost to uncondensed gases. An additional drawback of the reaction system was the requirement of preheating the feed. Since the objective was to quickly vaporize the feed in the reactor (for short residence time), the feed was preheated to 475° C. Thus, while the pyrolysis residence time was short, the overall time period for which feed was exposed to high temperature was still large and could have possibly resulted in some oil degradation during preheating. Furthermore, including a preheater also increases the capital cost of the reaction system.

Liquid product yields from known methods are typically in the range of 20-70%, depending on various factors such as reaction conditions and feedstock. Liquid products, rather than gas, are more desirable, since they have higher heating values on a volumetric basis and are easier to store and transport. Although pyrolysis of vegetable oil allows the direct production of hydrocarbons fuels, this technology has not yet achieved the high liquid yields necessary for commercial success. It would therefore be desirable to discover a process or system for achieving such yields.

SUMMARY OF THE INVENTION

Provided is a method of conducting pyrolysis, the method comprising atomizing an oil feedstock to produce atomized oil droplets, and pyrolyzing the atomized oil droplets in a reactor with or without a catalyst to produce pyrolysis products. Optionally, the pyrolysis products are reacted in-situ (with or without a catalyst) with one or more added reactants to produce reacted pyrolysis products. Also provided are the products of the method. In certain embodiments, the oil feedstock is a vegetable oil and comprises soy bean oil, canola oil, corn oil, palm oil, palm kernel oil, mustard oil, grape seed oil, hazelnut oil, linseed oil, rice bran oil, sesame oil, safflower oil, carapa oil, guava oil, tall oil, camelina oil, babassu oil, pennycress oil, coconut oil, or mixtures thereof. In certain embodiments, the oil feedstock comprises bio-oil or biocrude derived from thermal processing of other biomass feedstocks.

In certain embodiments, the reactor is pre-heated before the atomized oil droplets are introduced into the reactor. In certain embodiments, the method further comprises subjecting the pyrolysis products and/or the reacted pyrolysis products to a separation, purification, and/or processing step. In certain embodiments, the method further comprises distilling the pyrolysis products and/or the reacted pyrolysis products to produce one or more distillation products. In particular embodiments, the method further comprises subjecting the one or more distillation products to an additional separation, purification, or processing step. In particular embodiments, the additional separation, purification, or processing step is selected from the group consisting of a distillation process, an adsorption process, a filtration, a centrifugation, a crystallization, an extraction, an electrolysis process, an evaporation process, a hydrogenation process, an ozonolysis process, and an alkylation process.

In certain embodiments, the catalyst comprises zeolites, metal oxides, solid acid catalysts, or solid base catalysts. In particular embodiments the catalyst comprises ZSM-5, zeolite-Y, $Al_2O_3$, ZnO, or ZrO. In particular embodiments, the method further comprises capturing combustible gases escaping from use of the catalyst. In particular embodiments, the method further comprises recycling the captured combustible gases for heat or power.

In certain embodiments, the pyrolysis is conducted at a temperature ranging from about 400° C. to about 600° C.

In certain embodiments, no carrier gas is used.

In certain embodiments following a distillation, the distillation products include long chain fatty acids, and the method further comprises separating and collecting oleic acid. In particular embodiments, the method further comprises using the oleic acid as feedstock for oleochemical production.

In certain embodiments when a catalyst is used, the method further comprises separating and collecting aromatic compounds. In particular embodiments, the method further comprises producing jet fuel from the collected aromatic compounds.

In certain embodiments, the atomized oil droplets are in the reactor for a residence time ranging from about 6 seconds to about 300 seconds.

Further provided is a pyrolysis system comprising a feedstock source, an atomizer, a reactor, and a first separation apparatus. The atomizer is configured to receive feedstock from the feedstock source and deliver atomized droplets of the feedstock to the reactor, which is in fluid communication with the atomizer. The first separation apparatus is in fluid communication with the reactor such that pyrolysis products formed in the reactor are delivered to the first separation apparatus. In certain embodiments, the atomizer is an ultrasonic atomizer. In certain embodiments, the system further comprises a pump configured to deliver feedstock from the feedstock source to the atomizer. In certain embodiments, the system further comprises a second separation apparatus in fluid communication with the first separation apparatus.

BRIEF DESCRIPTION OF THE DRAWINGS

The patent or application file may contain one or more drawings executed in color and/or one or more photographs. Copies of this patent or patent application publication with color drawing(s) and/or photograph(s) will be provided by the U.S. Patent and Trademark Office upon request and payment of the necessary fees.

FIG. 6: Mass balance calculations for residence time estimates. $\dot{q}_l$=volumetric flow rate of liquid ($m^3/s$); $\rho_l$=density of liquid ($g/m^3$); $\dot{q}_v$=volumetric flow rate of vapor ($m^3/s$); $\rho_v$=density of vapor ($g/m^3$); P=reactor pressure (atm); Mw=molecular weight of triglyceride (g/gmol); R=universal gas constant ($m^3 \cdot atm/mol \cdot K$); T=reactor temperature (K); ṁ=feed mass flow rate (g/s); L=reactor length (m); A=reactor cross-sectional area (m$^2$); τ=vapor residence time (s).

FIG. 7: Table 1, displaying the composition (wt. %) of L-FAs present in the recovered liquid (see FIG. 5A).

FIG. 8: Table 2, displaying the composition (wt. %) of S-FAs present in the recovered liquid (see FIG. 5B).

FIG. 9: Table 3, displaying major classes of chemical compounds in recovered liquid.

FIG. 11: Table 4, displaying major chemical composition of distilled fraction.

FIG. 13: Table 6, displaying chemical composition of residue fraction.

FIG. 15: Table 7, displaying composition of S-FAs in DF and RF.

FIG. 17: Table 8, displaying chemical composition of oleic acid pyrolysis (feed and products).

FIG. 24A shows product yields and FIG. 24B shows product compositions.

DETAILED DESCRIPTION OF THE INVENTION

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

Provided are a system and method for continuous-flow pyrolysis of vegetable oils. In accordance with the present disclosure, vegetable oil is injected into a hot reactor in the form of small droplets, thereby improving vaporization/volatilization rates of the viscous vegetable oil. An atomizer can be used to create microscopic oil droplets. In addition to rapid vaporization, this approach allows uninterrupted addition of feed and thereby continuous operation of the reactor. Stagnation of fluid is also avoided due to rapid formation of vapors. Furthermore, the volatiles are pushed out due to the pressure created within the reactor from the formation of gases without the need to apply additional carrier gas. Thus, the cost associated with supplying and heating a carrier gas are eliminated, and a condenser size can be minimized.

Figure 1:
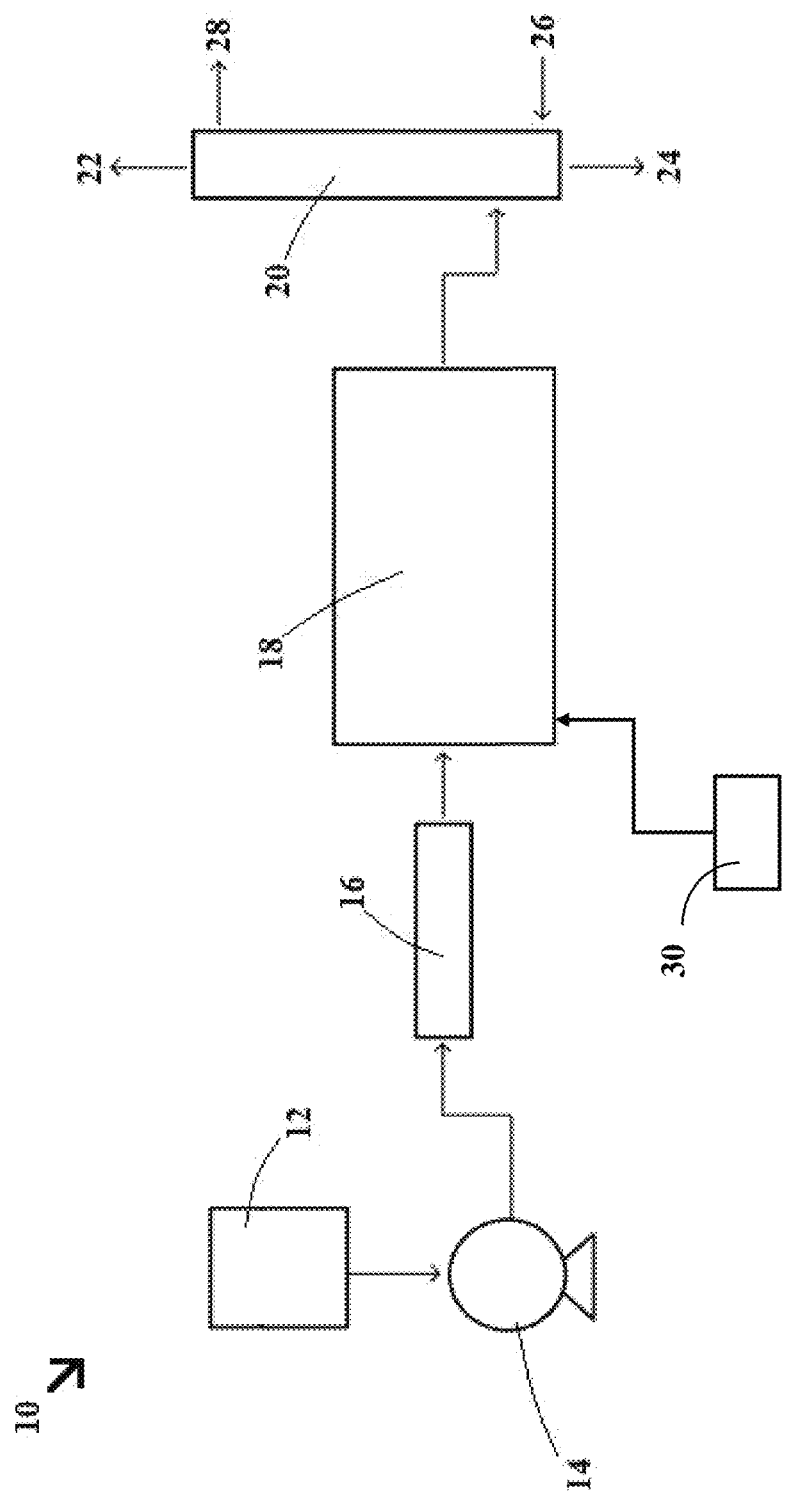
FIG. 1: Illustration of a non-limiting example of a continuous-flow pyrolysis reactor system.

Referring to FIG. 1, a non-limiting example of the system 10 generally includes a feedstock source 12, a pump 14, an atomizer 16, a reactor 18, and a separation apparatus 20 such as a condenser. The feedstock source 12 contains a suitable feedstock which is pumped by the pump 14 from the feedstock source 12 to the atomizer 16, where the feedstock is atomized into micron-sized droplets. The atomizer 16 is in fluid communication with the reactor 18 such that the atomized feedstock is released into the reactor 18, where pyrolysis takes place with or without a catalyst. The system can include an additional reactant source 30 configured to add suitable reactants to the pyrolysis reactor 18 to allow vapor phase reactions with or without the presence of catalyst in the reactor. The pyrolysis reactor 18 produces various pyrolysis products, which can then be fed into a separation apparatus 20, such as a condenser for distillation. Any number of suitable distillation processes, including fractional distillations, or other separation and/or purification processes, can be conducted to separate and/or purify the products as desired. As depicted in FIG. 1, a distillation produces a distillation fraction 22 and a residual fraction 24. A coolant, such as antifreeze or water, is generally run into the condenser 20 through an inlet 26 and out of an outlet 28. Optionally, the system 10 can further include one or more temperature controllers or thermocouples for monitoring purposes.

The feedstock is an oil feedstock, such as a vegetable oil. The term "vegetable oil" is used to refer to triglycerides or mixtures thereof that are generally derived or extracted from a plant. The feedstock can be any vegetable oil or mixtures thereof. For example, the feedstock can be soy bean oil, canola oil, corn oil, palm oil, grape seed oil, hazelnut oil, linseed oil, rice bran oil, sesame oil, safflower oil, carapa oil, guava oil, or mixtures thereof. Blended feedstocks are also possible. For example, recycled oil or waste cooking oil can be used as the feedstock. In some embodiments, the feedstock consists essentially of triglycerides, and has substantially no water or free fatty acids. In that regard, the term "vegetable oil" is meant to encompass feedstocks that consist essentially of triglycerides, even if not derived from a plant. In addition to vegetable oil, other liquid feedstocks encompass biomass-derived bio-oil or biocrude and/or mixtures thereof. It is understood that the system is tunable depending on the identity of the feedstock (e.g., the type of vegetable oil(s) or other liquid feedstocks). For example, the feedstock can optionally be pre-heated to lower its viscosity and make it flow easier, prior to being atomized. Pre-heating of the feedstock enables more viscous feedstocks to be atomized efficiently. However, pre-heating the feedstock is not necessary.

The pump can be any suitable pump, such as a peristaltic pump, capable of delivering feedstock from the feedstock source to the atomizer. Moreover, a pump is not strictly necessary, so long as feedstock is delivered to the atomizer at a suitable flow rate.

Any type of atomizer can be utilized so long as the atomizer is capable of producing micron-sized droplets out of vegetable oil. In one non-limiting example, the atomizer is an ultrasonic atomizer. In another non-limiting example, the atomizer is a mechanical atomizer. The atomizer produces micron-sized droplets of oil, such as droplets ranging from about 1 micron to about 100 microns, or from 20 microns to about 60 microns. The micron-sized droplets have increased surface area, and therefore reach the reactor temperature quicker and volatilize rapidly. Having all the reactions in vapor minimizes the side reactions and polymerizations. In essence, due to the rapid evaporation, the vaporized vegetable oil becomes like a carrier gas and pushes products out of the reactor, thereby eliminating the need for a carrier gas.

Once atomized, the droplets flow into the reactor for pyrolysis. The reactor can be any suitable furnace or other reactor capable of being heated to, and maintaining, the appropriate temperatures in the absence of oxygen. Many suitable pyrolysis reactors are commercially available. For example, tubular reactors used for gas-phase reactions, such as steam reformation of methane, are suitable, commercially available reactors. The pyrolysis is typically conducted at a temperature ranging from about 400° C. to about 600° C., or from about 425° C. to about 550° C. In some embodiments, the reactor is pre-heated to at least about 400° C. before the atomized droplets are introduced into the reactor. The residence time inside the reactor can be controlled by adjusting the flow rate. In some embodiments, the residence time ranges from about 6 seconds to about 300 seconds.

In vegetable oil pyrolysis, there are competing cracking and polymerization reactions. To prevent secondary reactions and achieve high liquid products yield, the system allows rapid vaporization of feed. This means a short residence time of feed is achieved, due to its rapid transition to vapor phase. Conventionally, a carrier gas, which requires an inert gas, is used to help prevent polymerizations. The carrier gas of known pyrolysis methods is also used to push out the solids (char) that collect in the furnace. However, use of a carrier gas generally necessitates large-sized condensers and also makes the condensation more energy inefficient. In the present method, even though a carrier gas is not needed, it is nonetheless possible to use a carrier gas. Furthermore, an inert gas may optionally be used to clean the system when the atomizer is off. In any event, in certain embodiments of the system and method herein, there is no carrier gas used.

The pyrolysis products are fed from the reactor into a downstream apparatus, such as a condenser, for separation, purification, and or further processing. Any suitable distillation or other downstream separation process, or combinations thereof, can be utilized to separate the pyrolysis products. In general, a distillation process produces a distilled (light) fraction and a residue (heavy) fraction, either of which may be further separated if desired. A simple distillation can be used to separate light hydrocarbons from heavy hydrocarbons. The distilled fraction typically contains lighter hydrocarbons, such as $C_5$-$C_{12}$ hydrocarbons, as well as aromatics (such as benzene, toluene, xylene, ethylbenzene, propylbenzene, and butylbenzene), and cyclic compounds (such as cyclooctane and cyclopentane methylene). Thus, using a simple distillation, the distilled fraction is generally similar to gasoline. When a fractional distillation is used, alkyl-benzenes can be isolated, which are useful aromatic compounds for jet fuel. A fractional distillation can separate gasoline, jet fuel, diesel, and fatty acids fractions from liquid products.

The residue fraction produced from a distillation, on the other hand, is generally rich in fatty acids and heavier hydrocarbons. For example, the residue fraction generally contains $C_{18}$ fatty acids, $C_{16}$ fatty acids, and $C_{13}$-$C_{17}$ hydrocarbons, among other products.

Figure 23:
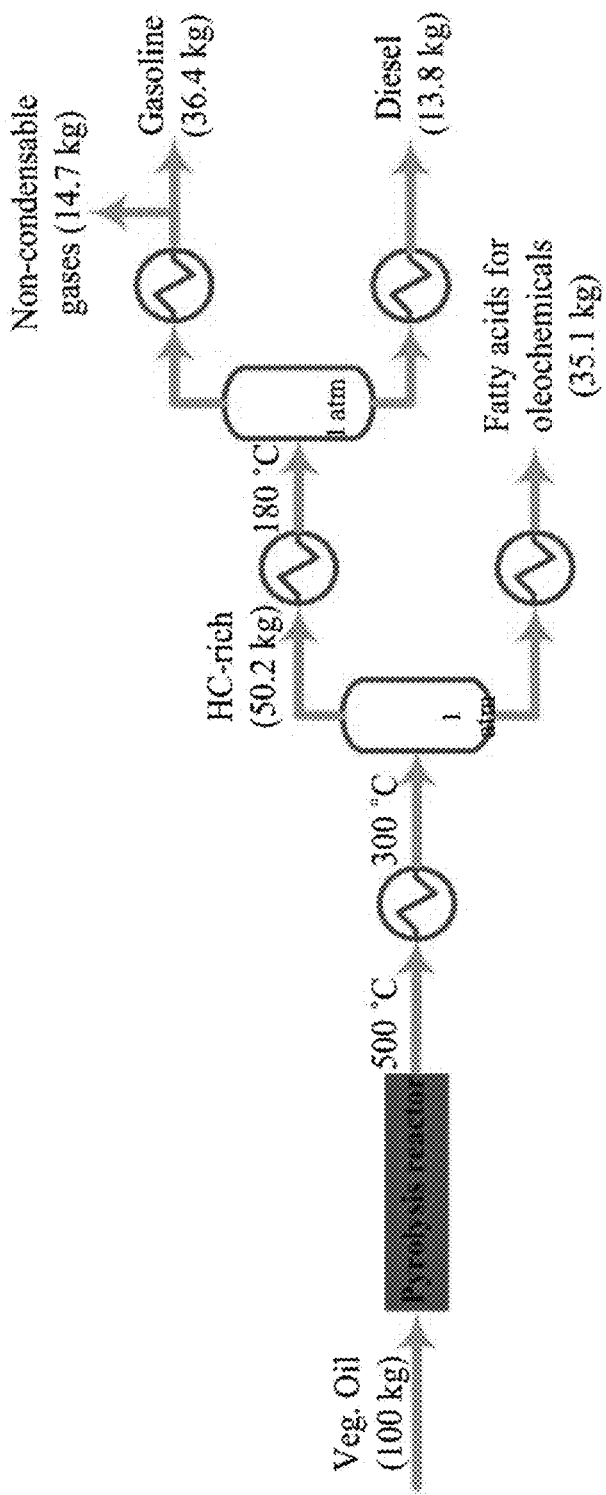
FIG. 23: Scheme of a non-limiting example method for producing gasoline and diesel from vegetable oil.

Either or both of the distilled fraction or the residue fraction can be subjected to one or more further downstream purification, separation, and/or processing processes, depending on the desired products. Non-limiting examples of further downstream purification, separation, and/or processing processes include distillation processes, adsorption processes, filtrations, centrifugations, crystallizations, extractions, electrolysis processes, evaporation processes, hydrogenation processes, ozonolysis, alkylation, and the like. Thus, for example, any number of distillations can be conducted to produce a wide variety of downstream products. These products include olefins, paraffins, aromatics, oleic acids, and fuel gas. Olefins and aromatics are precursors to a variety of chemical products. Also, oleic acid can be used as a precursor to produce oleochemicals. FIG. 23 shows a diagram of a non-limiting example of a method for producing gasoline and diesel from vegetable oil using the system described herein.

Importantly, distillation can be used to separate the fatty acids from the hydrocarbons. Fatty acids are useful in surfactants, paints, coatings, lubricants, textiles, inks, and food products, among other things. In fact, a significant portion of the fatty acids produced are oleic fatty acids (C18:1), which are desirable for nylon precursors, surfactants, emollients, and soldering fluxes, among other things. There is a significant demand for oleic acid. The cracking which occurs in the method described herein can enrich the oleic acid content. As a non-limiting example, using soy bean oil as the feedstock, the oleic acid content can be increased from about 20% to about 60%.

The catalyst, when used in the pyrolysis, is any suitable catalyst. When used, the catalyst is disposed in the reactor to catalyze reactions of the feedstock. For example, catalytic pyrolysis of vegetable oil with a solid acid catalyst can aid to selectively produce aromatics (in particular $C_7$-$C_9$) that are important to improve octane number of gasoline and jet fuel. One non-limiting example of a suitable solid acid pyrolysis catalyst is ZSM-5, which is a highly shape-selective catalyst. ZSM-5 is an aluminosilicate zeolite having the chemical formula of $Na_nAl_nSi_{96-n}O_{192} \cdot 16H_2O$, where n is from 0 to 27. ZSM-5 is a commercially available heterogenous catalyst. Another non-limiting example of a catalyst is ZrO which is a metal oxide that catalyzes the reactions of lipids with ammonia to produce fatty nitriles. Other suitable catalysts include, but are not limited to, microporous zeolite-Y, microporous zeolites as composites with mesoporous molecular sieve catalysts such as MCM-41 or SBA-15, and metal oxides such as $Al_2O_3$, ZnO, $Fe_2O_3$, CuO, or $V_2O_3$.

Use of a zeolite catalyst during pyrolysis can increase the aromatic production significantly. For example, up to about 70% of the liquid products can be aromatic compounds. However, increasing aromatic content comes at the cost of reducing total liquid yield, and also causes a decrease in the oleic acid content. Nonetheless, if jet fuel is the goal, then these tradeoffs may be acceptable for the particular application. Aromatics are also useful for other purposes, such as for conversion into polyethylene terephthalate (PET).

When a zeolite catalyst is used, the molecules that are structurally larger than the pore size of the catalyst tend to decompose in order to accommodate within the pores. For example, with ZSM-5, $C_2$-$C_{10}$ olefin production followed by cyclization/aromatization and dehydrogenation reactions leads to the formation of aromatics. Jet fuel has approximately 20% aromatics, such as the BTEX compounds (benzene, toluene, ethylbenzene, and xylenes). Therefore, for jet fuel production, there is a need to boost aromatic content. Catalytic pyrolysis with zeolite catalyst boosts aromatic content. More catalyst also causes more cracking, though, which reduces the total yield and causes gases to escape. However, these escaped gases are combustible gases that can be recycled for power.

When a metal oxide catalyst is used along with addition of ammonia into the pyrolysis reactor, the ammonia reacts with the triglyceride vapors or the fatty acids produced during pyrolysis to produce fatty nitriles over a reaction period of a few seconds. In contrast, the traditional Nitrile Process does not use triglycerides as a feed; instead, triglycerides are first converted to fatty acids through hydrolysis and then reacted with ammonia in a liquid phase reaction that occurs over several hours. Thus, the vapor phase nitrile reaction in the presently described pyrolysis reactor system is significantly faster than the traditional Nitrile Process, and is also a one-step method that can directly process triglyceride (vegetable oil) feeds. Further, during the traditional Nitrile Process, undesirable side reactions occur with unsaturated fatty acids (e.g. oleic acid). The vapor phase nitrile reaction of this invention lowers the potential side reactions and improves the nitrile yield.

The products of the method described herein include various FAs and their derivatives. In a non-catalytic process, the recovered FAs can be used in a wide variety of products, including fuels, surfactants, polyamides, adhesives, corrosion inhibitors, emollients, lubricants, paints, coatings, food additives, and precursors for other valuable products. Moreover, the identity of the FAs produced by the method herein can be tailored based on the desired application. The reactor also allows for in-situ production of fatty acid derivatives by employing suitable catalysts. For example, fatty acids can be converted to fatty nitriles by in-situ reaction of pyrolysis vapors with ammonia in the presence of metal oxide catalysts. It is also possible to produce fatty acid methyl esters (commonly known as biodiesel) by in situ reaction of the pyrolysis vapors with methanol in the presence of a suitable catalyst. The skilled person will recognize that a variety of catalysts can be employed to tailor the process for the production of specific downstream products. Moreover, a catalyst can be reused by burning off any coke that has formed on the catalyst. The method herein significantly cuts down on the coke formation because the reactions are in the vapor phase. Reactants in the vapor phase do not contact the catalyst (when present) for as long, and therefore form less coke. Liquid build up, and associated polymerization/coke formation, can thus be avoided or prevented. Because coke formation deactivates the catalyst, this aspect of the method described herein is another advantage over known methods.

With the pyrolysis system and method described herein, vapor residence times of 1-300 seconds can be achieved without a carrier gas. The pyrolysis system can eliminate carrier gas and preheating, which, in turn, decreases capital and operating costs. The method results in improved yield of liquid products from pyrolysis by allowing introduction of micron-sized droplets of oil that can be rapidly vaporized in the furnace. Low vapor residence times can be achieved without preheating the feed, though preheating the feed is nonetheless possible. Furthermore, the system and method are easily scalable.

The system and method described herein can produce a high yield of different types of fuels in addition to valuable petro and oleochemicals. In some embodiments, the method can achieve about 93% of the theoretical liquid yield. These high yields are a significant improvement over the 60% yields obtainable through known methods. The high yield of the liquid products that can be achieved minimize the feedstock loss. Relative to the current practice of making biodiesel as a fuel from vegetable oil, the method herein is a simpler route to producing multiple fuels and chemicals from the same feedstock. The process is also applicable to feedstocks such as lipids from algae which can have a high content of free fatty acids.

Figure 22:
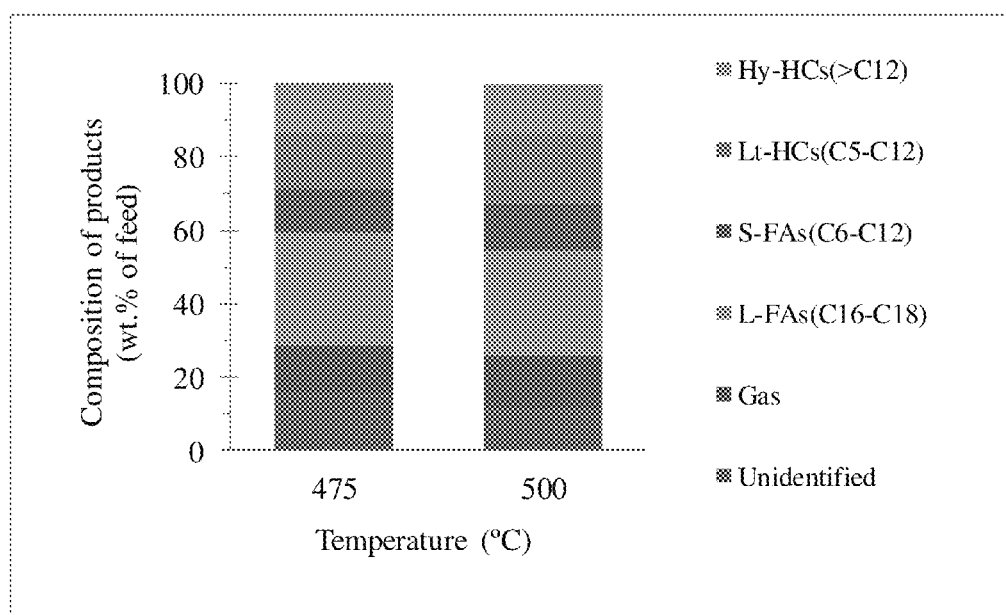
FIG. 22: Composition of pyrolysis products at a vapor residence time of 60 seconds.

As described in the Examples herein, conversion of soybean oil was carried out in a continuous pyrolysis system with feed injected through an atomizer. This allowed introduction of micron-sized droplets of oil that could be rapidly vaporized inside the reactor. Vapor residence times ($\tau$) of 6-300 s were achieved without use of carrier gas, which significantly reduces the overall cost of pyrolysis. Effects of reaction temperature ($450 < T < 500°$ C.) and $\tau$ on conversion, product yields, and composition were investigated. At the optimum experimental conditions of T=500° C. and r=60 s, the yield of pyrolysis liquids was as high as 88% (relative to feed mass). Under these conditions, the identified products consisted of 38% hydrocarbons (22% $C_5$-$C_{12}$ and 16%>$C_{12}$), 33% long-chain fatty acids ($C_{16}$-$C_{18}$, but primarily oleic acid), and 15% short-chain fatty acids ($C_6$-$C_{12}$). (FIG. 22.) Upon distillation of the liquid products, the long-chain fatty acids were cleanly separated from the hydrocarbons. Overall, the results demonstrate the feasibility of producing liquid products at high yields, including a wide range of fuels (gasoline, jet, and diesel), and enriched oleic acid (for oleochemicals production), using the continuous flow system for pyrolytic conversion of vegetable oil.

EXAMPLES

Example 1: Non-Catalytic Pyrolysis of Vegetable Oil

Vegetable oil was processed in a continuous flow pyrolysis system where feed was injected through an atomizer. This allowed introduction of micron-sized droplets of oil that could be rapidly vaporized inside the reactor. With this configuration, vapor residence times of 1-300 seconds were achieved. The pyrolysis system eliminated carrier gas and preheating.

Materials

Soybean oil was obtained from Zoyeoil (Zeeland, Mich., USA). Hexane, chloroform, methanol, N-methyl-2-pyrolidone (NMP), sulfuric acid, and enriched oleic acid were purchased from Fisher Scientific (Pittsburgh, Pa., USA). Analytical standards for fatty acids (stearic acid, 100 oleic acid, linoleic acid, and palmitic acid), glycerides (triolein, diolein, and monolein), FAMEs (mixtures of $C_8$-$C_{22}$ FAMEs), alkanes ($C_5$, $C_6$, $C_7$, $C_8$, and mixtures of $C_7$-$C_{30}$), olefins-(Alphagaz PIANO), and aromatics-(Alphagaz PIANO) were purchased from Sigma-Aldrich (St. Louis, Mo., USA).

Experimental Set-Up

Figure 2:
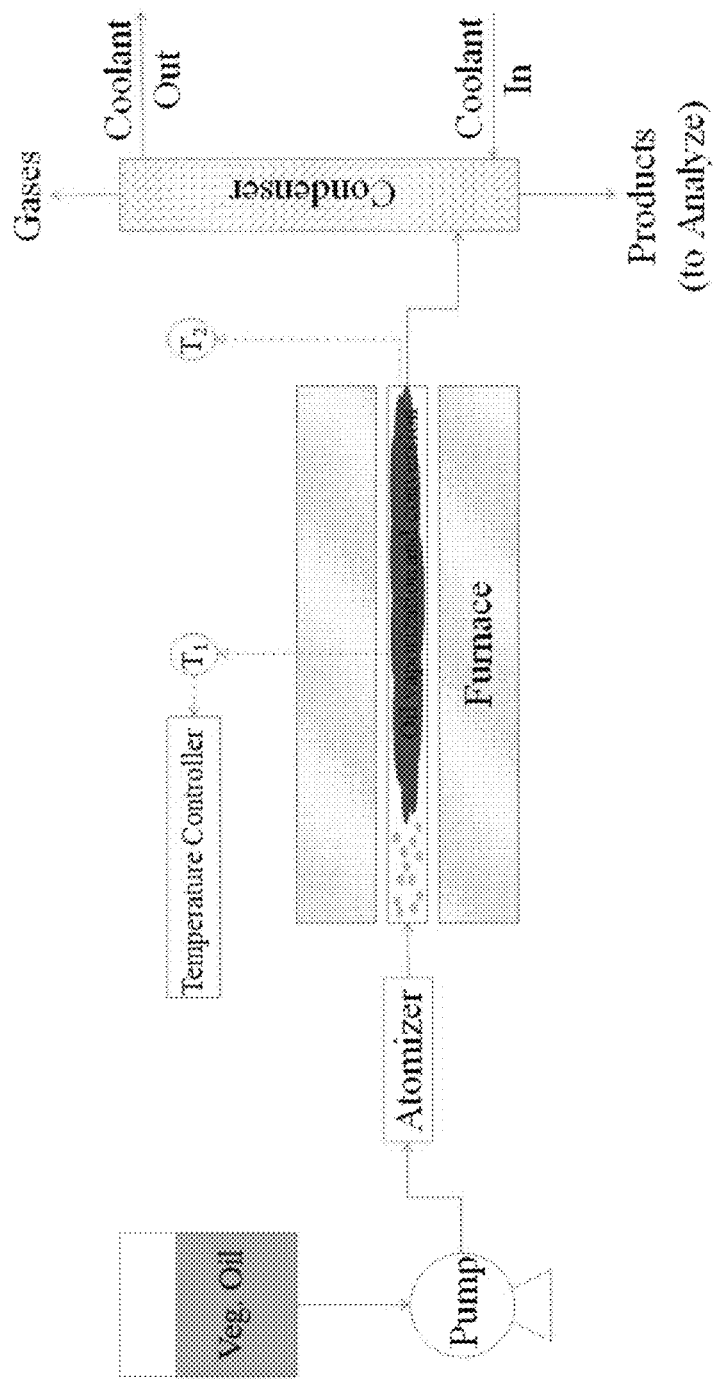
FIG. 2: Color schematic diagram of the continuous-flow pyrolysis reactor used in the Examples described herein.

All experiments were performed in a continuous pyrolysis system that is schematically shown in FIG. 2. A stainless steel tube with an inner diameter (ID) of 2.18 cm and length of 23 cm served as the pyrolysis reactor. The tube was placed in a clam-shell furnace (Applied Test Systems, Butler, Pa., USA) with 10 cm ID and 38 cm length, and equipped with a temperature controller to maintain the set-point temperature. A high-temperature ultrasonic atomizer (Sonazop, Farmingdale, N.Y., USA; model: HTNS40) was attached to one end of the reactor tube to introduce soybean oil into the pyrolysis reactor. The atomizer consisted of an ultrasonic probe with a 4 mm diameter, which was operated at a constant frequency of 40 kHz.

For precise control of feed flowrate, an HPLC pump (Waters, Milford, Mass., USA; model: 515) was used. After pyrolysis, product vapors were passed through a condenser system which consisted of one cold-trap and two Allihn condensers connected in series. Commercial antifreeze was used as coolant for the Allihn condensers. The antifreeze was cooled to approximately −20° C. using dry ice and pumped through the Allihn condensers via a Masterflex™ L/S peristaltic pump (Cole-Parmer, Vernon Hills, Ill., USA).

Prior to each experiment, the reactor was placed in the furnace and heated while being purged with pure $N_2$ to remove any traces of $O_2$ from the system. After the reactor reached the set point temperature, the $N_2$ purge was stopped, the atomizer was turned on, and the feed pump was started at a set flow rate to provide a pre-specified vapor residence time (1-300 s) in the reactor. The system was operated in continuous mode for a duration of 10-170 min, depending upon the set feed flow rate. Over this period, approximately 10 g of soy oil was processed. The exact feed mass introduced into the reactor was calculated from the difference in the weight of feed tank before and after each experiment.

At the end of the experiment, the reactor furnace was turned off and allowed to cool to room temperature. Thereafter, the liquids from all condensers were collected and weighed on an analytical balance (Mettler Toledo, USA) with ±0.1 mg accuracy.

Conversion of soybean oil to non-glyceride products was calculated according to the following equation:

$$\text{Conversion } (\%) = (W_O - (W_{TG})_{out})/W_O \times 100$$

where $W_O$ is the mass of oil introduced into the reactor and $(W_{TG})_{out}$ is the mass of glycerides in collected liquid. The yield of pyrolysis liquids was calculated according to the following equation:

$$\text{Yield } (\%) = (W_L/W_O) \times 100$$

where $W_L$ is the weight of pyrolysis liquids collected. The yield of non-glyceride liquid products was calculated as follows:

$$\text{Yield of non-glyceride liquid } (\%) = (W_L - (W_{TG})_{out})/W_O \times 100$$

The feed was assumed to be all triglycerides.

Fractionation of Pyrolysis Liquid Products

A simple lab-scale vacuum distillation unit was used to separate the components of pyrolysis liquid products. The procedure used is as follows: the liquid products collected after pyrolysis were transferred to a round-bottom boiling flask that was placed in a silicone oil bath. The bath was kept on a hot stir plate and heated to distillation temperature. The boiling flask was connected to a short Vigreux-type condenser followed by a Liebig condenser, and finally a collecting flask. A vacuum pump (Fisher Scientific; model: Maxima C plus) was connected to the collecting flask to maintain the distillation unit under a vacuum of 60 mm Hg. As described above, commercial antifreeze cooled to −25° C. was used as a coolant for the Liebig condensers and recirculated via a Masterflex L/S pump. The collecting flask was kept immersed in liquid $N_2$ during distillation.

Experimental Design

Temperature and vapor residence time are the two variables that can impact the yield and characteristics of pyrolysis products. In this example, vapor residence times of 1, 6, 60, and 300 s were tested to compare flash, fast, and slow pyrolysis regimes. Feed mass flowrates were adjusted to obtain the desired vapor residence time (detailed calculations are described below). Reaction temperatures of 450, 475, and 500° C. were selected to investigate effects of temperature. The lowest reactor temperature in this example (450° C.) is above the expected volatilization temperature of triglycerides (>410° C.). A full factorial design with twelve runs was employed. In addition, one experiment at severe operational conditions (T=550° C. and τ=300 s) was performed to analyze the liquid products composition and the productivity of system at harsh reaction conditions. In this example all experiments are represented by a T-τ code system, where T represent the reaction temperature in ° C. and τ indicates the vapor residence time in seconds. For instance, the code 475-6 describes an experiment at reaction temperature of 475° C. and a vapor residence time of 6 s.

Feedstock Analysis

To identify and quantify fatty acid constituents in the feedstock, soybean oil was transesterified to FAMEs by reacting 5 mg soybean oil with 2 mL of a methanol-sulfuric acid mixture (95/5 vol. %). The reactants were placed in a 5 mL sealable vial and immersed in a hot water bath at 90° C. for 90 min. Afterward, the reaction mixture was cooled and the FAMEs were extracted into 2 mL hexane (extraction conditions: 90° C., 15 min). The extract was analyzed by gas chromatography.

Gas Chromatography Analysis

To identify and quantify chemical compounds in the pyrolysis products and feedstock, a gas chromatograph (Shimadzu 2012 plus) equipped with a flame ionization detector (FID) and an auto sampler (AOC-20i) was used. For analysis of triglycerides, diglycerides, long-chain fatty acids and feedstock FAMEs, an RTX-biodiesel (Restek, Bellefonte, Pa., USA) column was employed (15 m length, 0.32 mm ID, and 0.1 μm film thickness). The injector and FID detector temperatures were 370° C.; 14 sample was injected. $H_2$ was used as the carrier gas with a flowrate of 6.02 mL min-1 and a split ratio of 1:10. The column temperature was initially set at 60° C. for 1 min, and was subsequently heated at a temperature ramp rate of 10° C. min-1 to 370° C.; this final temperature was maintained for 5 min at the end of the run. FID detector response was first calibrated using appropriately diluted (in hexane or chloroform) FAME standards, long-chain fatty acid standards, monoolein, diolein and triolein (0.05-5 mg mL-1). For sample analysis, the samples were diluted to concentrations of 2-5 mg-sample mL-1 in chloroform (for pyrolysis biooil) or hexane (for FAME analysis of transesterified feed). Monoglyceride, diglyceride, triglyceride, FAME, and long-chain fatty acid concentrations in the samples were estimated from calibration curves.

For preliminary analysis of hydrocarbons in the pyrolysis products, an RTX-5 (Restek, Bellefonte, Pa., USA) column (15 m length, 0.25 mm ID, and 0.25 nm film thickness) was used. The injector and FID detector temperatures were kept at 350° C.; 1 μL sample was injected. $H_2$ was used as the carrier gas with a constant flowrate of 1 mL min-1 and a split ratio of 1:10. The column temperature was initially at 30° C. for 3 min, and was subsequently heated at a temperature ramp rate of 10° C. min-1 to 350° C.; this final temperature was maintained for 3 min at the end of the run. Since the hydrocarbons were not well separated on this column, only relatively few peaks were observed, likely due to overlap of similar chemical compounds. In these analyses, calibration curves were developed using external analytical alkane standards and the concentration of each hydrocarbon group (e.g. $C_8$ hydrocarbons) in the sample was estimated based on the calibration response of a representative alkane (e.g. $C_8$ alkane). Pyrolysis liquid product samples were diluted to concentrations of 2-5 mg-sample mL-1 in chloroform for analysis.

For additional detailed analysis of hydrocarbons in the distilled fraction of the pyrolysis products, a DB-petro (Agilent, Santa Clara, Calif., USA) column (50 m length, 0.25 mm ID, and 0.5 μm film thickness) was employed. The injector and detector temperatures were kept at 300° C.; 14 sample was injected. $H_2$ was used as the carrier gas with a constant flowrate of 1 mL min-1 and a split ratio of 1:10. The column temperature was initially maintained at 35° C. for 15 min. Thereafter, the temperature was increased at a ramp rate of 1° C. min-1 to 60° C. The column was then maintained at this temperature for 20 min. Finally, the column temperature was increased to 300° C. at a ramp rate of 2° C. min-1 and held at the final temperature for 2 min at the end of the run. All samples were analyzed three times and the product compositions were calculated based on relative peak area. Mean values of the estimated composition are reported. Distilled fraction samples were diluted to concentrations of 2-5 mg-sample mL-1 in chloroform for analysis.

GC-MS (Bruker, 450-GC equipped with 300-MS) analysis was performed to identify the chemical compounds in the pyrolysis products and also for quantification of derivatized short-chain fatty acids (see more detailed description in the next paragraph). An Agilent DB-5MS fused silica capillary column (length: 30 m, ID: 0.25 mm, and film thickness: 0.25 μm; Agilent Technologies, Santa Clara, Calif.) was used. The injector temperature was held constant at 300° C. and a split ratio of 1:100 was maintained during each sample analysis. 14 sample was injected. Helium was used as carrier gas with constant column flow of 1.0 mL min-1. The column was programmed as follows: constant temperature of 30° C. for 10 min, followed by a temperature ramp 10° C. min-1 to 300° C. and a final hold for 10 min. The transfer line, ion source, and manifold were maintained at 300, 150, and 40° C., respectively. Chemical compounds corresponding to chromatogram peaks were identified using NIST2008 mass spectral database. A minimum 70% confidence level was used as a threshold for positive identification of IDs provided by the spectral analysis software.

Results
Design of the Experimental Pyrolysis System

To prevent secondary reactions and achieve a high yield of liquid products, a reactor that would allow rapid vaporization of feed was designed. Without wishing to be bound by theory, it is believed that this design provides the means to maintain a short residence time of feed due to its rapid transition to vapor phase which quickly flows out of the reactor. In addition, liquid build up is avoided and thereby polymerization/coke formation is prevented. One way to improve vaporization/volatilization rates of viscous vegetable oil is by injecting it into a hot reactor in the form of small droplets. This creates a very large surface area to promote rapid heat transfer and vaporization of the oil. An atomizer was used to create microscopic oil droplets. In addition to rapid vaporization, this approach allows uninterrupted addition of feed and hence continuous operation of the reactor. Stagnation of fluid was also avoided due to rapid formation of vapors. Finally, the vapors and volatile products were pushed out without the need to apply additional carrier gas. Thus, the cost associated with supplying and heating the carrier gas are eliminated. Elimination of carrier gas also minimizes the condenser size.

Disintegration of a liquid film into fine droplets in the surrounding environment is known as atomization. In the ultrasonic atomizer used in the reactor, the mechanical vibration generated from a piezoceramic element is transferred to the in-flowing liquid creating capillary waves, which disintegrate into fine droplets and form a dense fog that exits the atomizer nozzle. The droplet size generated by atomizers can be estimated from the characteristics of the atomization device as well as fluid properties and flow rates. In this example, it was estimated that the average droplet size of oil ejected from the atomizer was between approximately 20 to 60 μm (depending on feed flowrates) under ambient temperature conditions [soybean oil density 910 kg/m$^3$, surface tension 32.9 mN/m, and viscosity 38 mPa-s]. At high temperature pyrolysis conditions, droplet size would be lower; however, the droplet size within the hot reactor was not able to be estimated due to unavailability of temperature dependent vegetable oil properties. Assuming that vaporization is nearly instantaneous, the following equation derived from the Ideal Gas Law was used to calculate the mass flowrates of the generated vapors at different reaction temperatures to obtain a target vapor residence time:

$$\dot{m} = \frac{LAPM_w}{RT\tau}$$

where L is reactor length (m), A is reactor cross sectional area (m$^2$), P is pressure (atm), $M_w$ is soybean oil molecular weight (875 g/gmol), R is universal gas constant (0.000082 m$^3$·atm/mol·K), T is reactor temperature (K), and τ is vapor residence time (s). Mass flowrate was divided by soybean oil density to estimate the feed volumetric flowrate (see more detailed derivation of the above equation in FIG. 6).

The residence time can also be calculated based on product composition. Since the average molecular weight of the product is much lower than the feed, the residence time calculated based on product composition will be lower since residence time is directly proportional to the molecular weight. However, estimates of residence time based on product composition are likely less accurate than the residence time estimates from feed mass (τ) due to the uncertainty (especially under more severe reaction conditions) associated with unidentified liquid and uncondensed gas products. Finally, since the reactor is of a column design ("plug-flow" rather than a "complete back mix"), the product compositions likely vary along the length of the reactor. Since the primary purpose of residence time calculation (for the gas phase reaction described here) is to allow empirical reactor design, rather than to assess fundamental reaction kinetics, the choice of feed-based residence time estimates allow for correlation of product yields with feed flow rates—a parameter that could be easily controlled in commercial practice. As such, a feed-based residence time (τ) is used to discuss the results.

Thermal decomposition and volatilization of vegetable oil is slow below 420° C. In addition, thermodynamic simulations of vegetable oil cracking reactions indicate that the scission of C═C starts at 400° C. To stay sufficiently above the minimum reaction temperature threshold, the lowest temperature used in these examples was 450° C. Very high temperatures are also known to decrease the liquid products yield (due to further cracking), in addition to increasing the operating costs. Consequently, the highest temperature in these examples was kept at 550° C.

Feedstock Characterization

Soybean oil was derivatized to FAMEs to quantify the fatty acid composition of feed by GC-FID. These results show that the soybean oil used in these examples was composed of linoleic and linolenic (53.4 wt. %), oleic (30.6 wt. %), palmitic (9.8 wt. %), and stearic (6.2 wt. %) acids. The majority of fatty acids in soybean oil (84%) were unsaturated.

Pyrolysis Yield

Figure 3A:
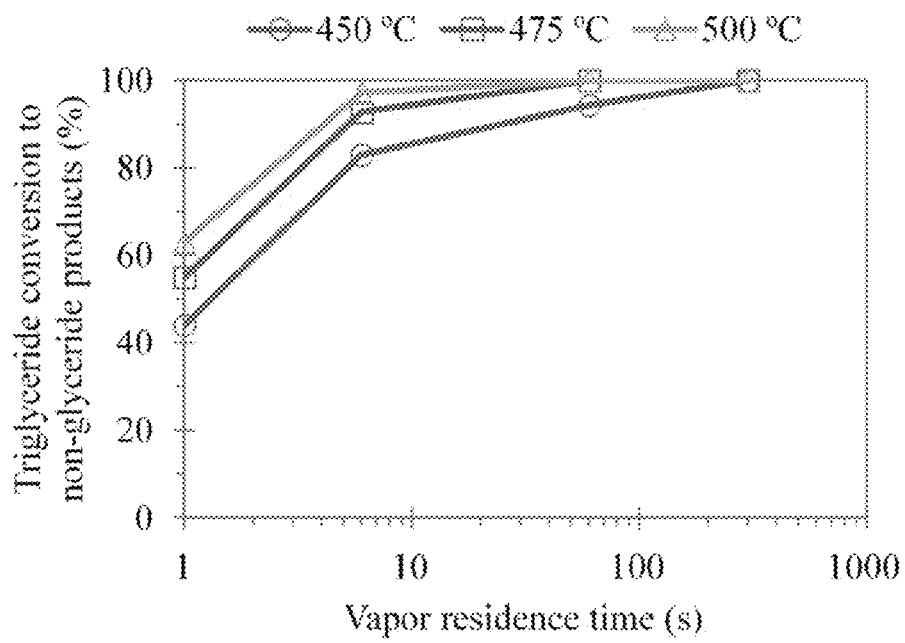
FIGS. 3A-3C: Graphs showing the conversion of feed to non-glyceride products (FIG. 3A), yield of liquid recovered (FIG. 3B), and yield of non-glyceride liquid products versus vapor residence time at the pyrolysis temperature (FIG. 3C). Dashed lines represent the theoretical yield of non-glyceride liquid products.

FIG. 3A shows the increase in pyrolytic conversion of soybean oil with increasing $\tau$ and reaction temperature. Thermal cracking of vegetable oil is an endothermic reaction, and is thus favored at high temperature. At high reaction temperature (475-500° C.), nearly 100% conversion was observed even at a low $\tau$ (~6 s). However, at low temperature (450° C.) complete conversion was achieved at much higher vapor residence time (60-300 s). Interestingly, at very short vapor residence time ($\tau=1$ s) conversion of soybean oil was nearly 40-60% at all reaction temperatures, which indicates that the reaction is initially fast and possibly first-order.

Figure 3B:
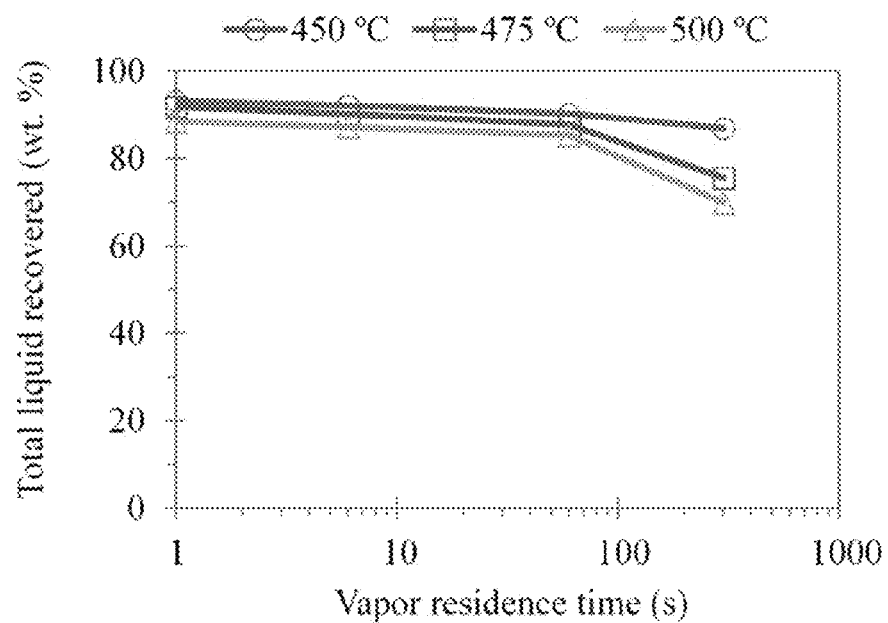

To assess loss of material to non-condensable gases, FIG. 3B shows the mass fraction of liquid product recovered relative to feed mass with change in vapor residence time at the pyrolysis temperatures of the experiments. These values include unconverted feed, which is especially significant at low vapor residence time ($\tau<6$ s) (refer to FIG. 3A). At even very short reaction residence time ($\tau=1$ s), nearly 7-10% of feed mass is lost. It has been demonstrated that the first step in triglyceride pyrolysis is the release of the glycerol backbone and its conversion to non-condensable gases. From the results in these examples, this first step appears to be rapid and seems to occur within 1 s of reaction. After 1 s, loss of products as gases remains nearly constant until 60 s. Thereafter, at high vapor residence time ($\tau>60$ s) the yield of recovered liquid decreases, likely due to further decomposition of products.

Figure 3C:
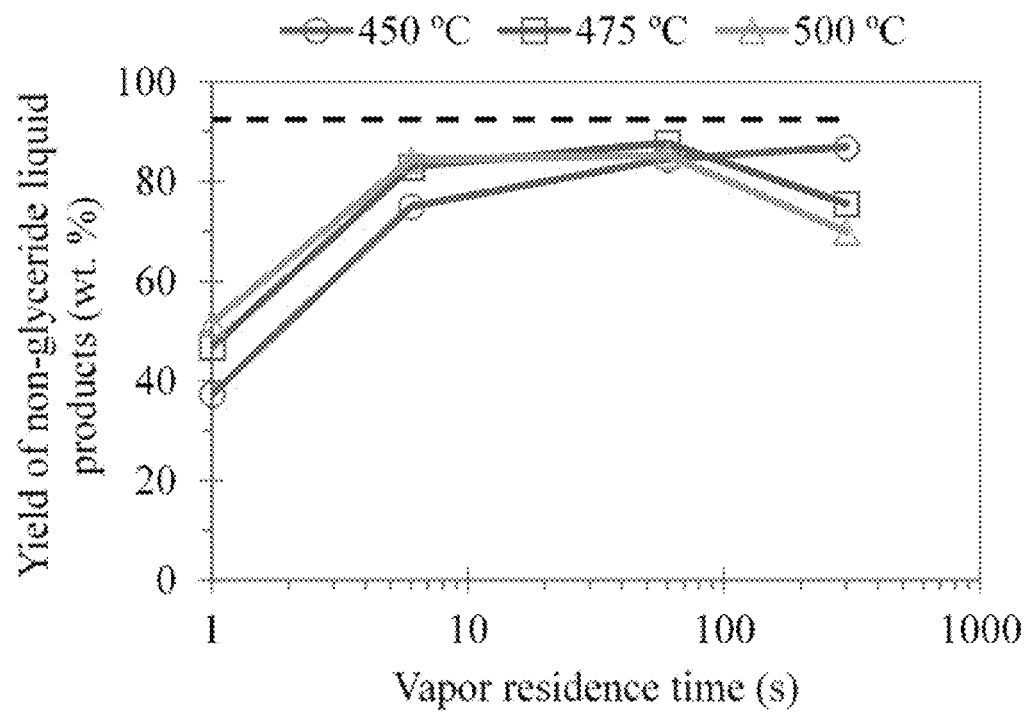

FIG. 3C shows the effects of $\tau$ and temperature on the yield of non-glyceride liquid products (equal to mass of total liquid recovered minus the mass of glyceride in liquid product). For instance, at the experimental condition of 500-6, the total mass fraction of recovered liquids is 87% (relative to feed mass, FIG. 3B) but contains 3% of unreacted triglyceride (FIG. 3A), therefore the yield of non-glyceride liquid product for this experiment is 84% (FIG. 3C). As observed from FIG. 3C, the yield of non-glyceride liquid product increases most significantly between 0-6 s, but decreases at high vapor residence time ($\tau>60$ s). At $\tau=1$ s, although yield of liquid recovered is high (FIG. 3B), conversion of feed is low (FIG. 3A) and thus yield of non-glyceride liquid product is low (FIG. 3C). At $\tau$ between 6-60 s, due to high yield of liquid recovered (FIG. 3B) and conversion (FIG. 3A), high yield (>85%) of non-glyceride liquid product was achieved.

When the glycerol backbone is released during triglycerides pyrolysis (the first step in triglyceride decomposition), acrolein ($C_3H_4O$; MW=56 g/gmol) is produced (one mole per mole of triglyceride), which then decomposes to non-condensable $C_2H_4$ and CO. Given this reaction mechanism, the theoretical yield of liquid from soybean oil pyrolysis was calculated to be approximately 93 wt. % by discounting the estimated mass of acrolein produced from the feed mass. An average soybean oil molecular weight of 875 g/gmol was used for these calculations. In FIG. 3C, the dashed line represents this theoretical maximum liquid product yield.

When pyrolysis was performed under the reaction conditions of 6 s<$\tau$<60 s and 475<T<500° C., the yield of non-glyceride liquid products was between 83-88 wt. %—values that are close to the theoretical prediction for maximum liquid product yield. The high yield of liquid products under these conditions (when $\tau<60$ s) indicate that secondary reactions were sufficiently slow such that pyrolysis products remained as condensable liquids but did not significantly decompose to non-condensable gaseous products.

At $\tau>60$ s and T$\geq$475° C., yield of non-glyceride liquid product decreased with temperature (except at 450° C.), likely due to further breakdown of non-glycerides to non-condensable gases at higher reaction temperature and residence time. Interestingly, at reaction temperature of 450° C., yield of non-glyceride liquid product continued to increase over $\tau$ between 1-300 s, indicating that secondary reactions (which cause further cracking of liquid product and gas formation) are even slower (or absent) at low reaction temperature.

In the pyrolysis system used in these examples, liquid yield from pyrolysis of lipids was significantly improved (as high as 88%) relative to known methods (20-70%). Without wishing to be bound by theory, the high yields are likely due to the rapid volatilization of the feed and the short vapor residence time, which decreases the chance for pyrolysis products to undergo secondary reactions. These examples show that in order to achieve high liquid product yield, the optimal vapor residence time should be between 6-60 s. To reach such a short vapor residence time, rapid vaporization of feed is important. In the pyrolysis system, due to atomization of vegetable oil, small droplets of oil were able to vaporize and reach the reactor temperature rapidly, which allowed the pyrolysis to be carried out at a short vapor residence time.

Products Analysis

Figure 4:
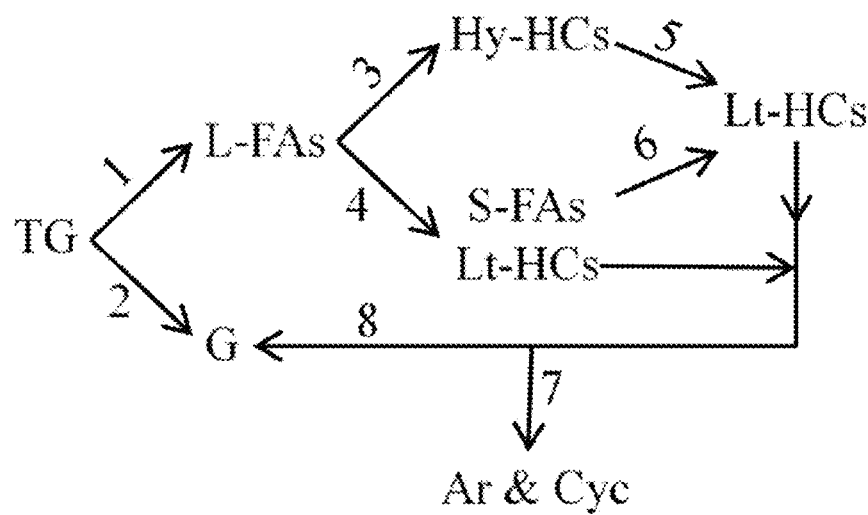
FIG. 4: Diagram showing a general thermal cracking mechanism of soybean oil: (1) initial cracking of triglyceride that generates free radical $RCOO^-$ or/and $RCO^-$; (2) gases produced as the result of loss of the glycerol backbone; (3) decarboxylation and/or decarbonylation of long chain fatty acids, followed by hydrogenation and/or dehydrogenation that produces heavy hydrocarbons; (4) C—C double bond cleavage of long chain fatty acids to produce short chain fatty acids and light hydrocarbons; (5) long chain hydrocarbon breakdown due to cleavage of unsaturated C—C bonds to produce light hydrocarbons; (6) decarboxylation of short chain fatty acids to produce light hydrocarbons; (7) Diels-Alder reaction (reaction between a diene and alkene) to produce cyclic compounds and/or aromatics (due to dehydrogenation of cyclic compounds); and (8) breakdown of light hydrocarbons to non-condensable gases (e.g., ethylene elimination). TG: triglyceride, L-FAs: long-chain fatty acids, G: gases, Hy-HC: heavy hydrocarbons, S-FAs: short-chain fatty acids, Lt-HC: light hydrocarbons, Ar: aromatic, and Cyc: cyclic compounds.

FIG. 4 shows a general schematic of the principal steps involved in thermal cracking of vegetable oil. As discussed above, the first step in thermal cracking of triglycerides is the disintegration of the glycerol backbone. Subsequently, the long-chain fatty acids (L-FAs) can further degrade via two parallel pathways. In one case, they may decarboxylate and/or decarbonylate and produce heavy hydrocarbons (Hy-HCs). Alternatively, the L-FAs can degrade at the sites of C=C bonds and form short-chain fatty acids (S-FAs) and light hydrocarbons (Lt-HCs). The Hy-HCs produced from reaction 3 (FIG. 4) can also subsequently crack at the C=C sites and form Lt-HCs. In parallel, the S-FAs from reaction 4 (FIG. 4) can release $CO_2$ and/or CO due to decarboxylation and/or decarbonylation and produce Lt-HCs. Aromatics and cyclo-compounds can also form from the Diels-Alder reaction of dienes and alkenes. Finally, unsaturated Lt-HCs also may break down further (due to C=C bond) and produce $C_1$-$C_4$ uncondensable hydrocarbons (reaction 8, FIG. 4). Overall, this mechanism indicates that due to the complexity of the cracking reactions, a diverse distribution of chemicals constituents (such as L-FAs, S-FAs, Hy-HCs, Lt-HCs, G, cyclic, and aromatics) can be produced during pyrolysis. This mechanism also indicates that lighter products (secondary reactions) are progressively formed with increase in residence time. If the residence time is excessive, a large proportion of the feed forms gases. The mechanism further indicates that with optimization of reaction temperature and residence time, the formation of non-condensable gases can be minimized. It is also possible to partially control product compositions (low MW versus high MW) through changes in reactor temperature and residence time.

Figure 5A:
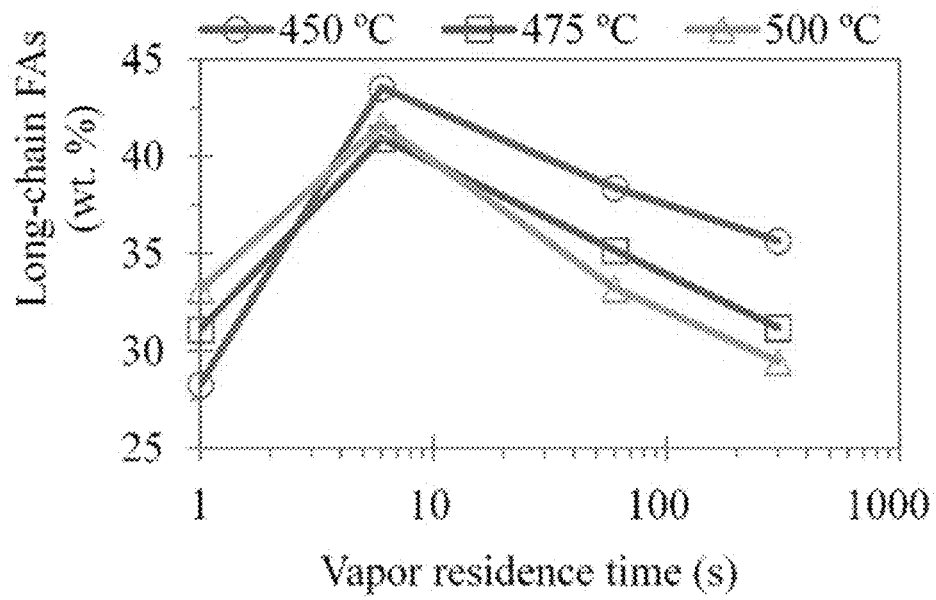
FIGS. 5A-5D: Content of long-chain fatty acids (FIG. 5A), short-chain fatty acids (FIG. 5B), heavy hydrocarbons (FIG. 5C), and light hydrocarbons (FIG. 5D), in the recovered pyrolysis liquids at the tested reaction conditions.
Figure 5B:
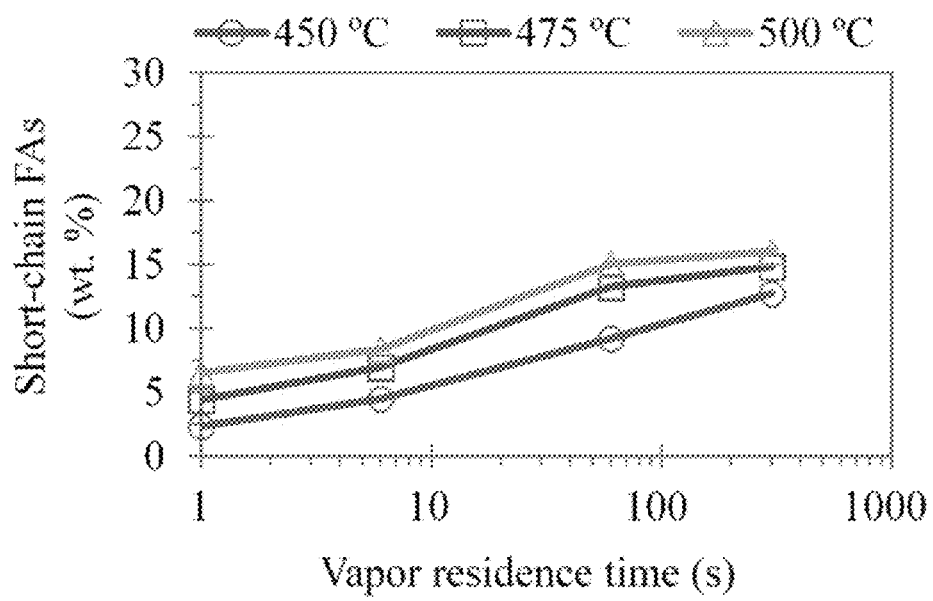
Figure 5C:
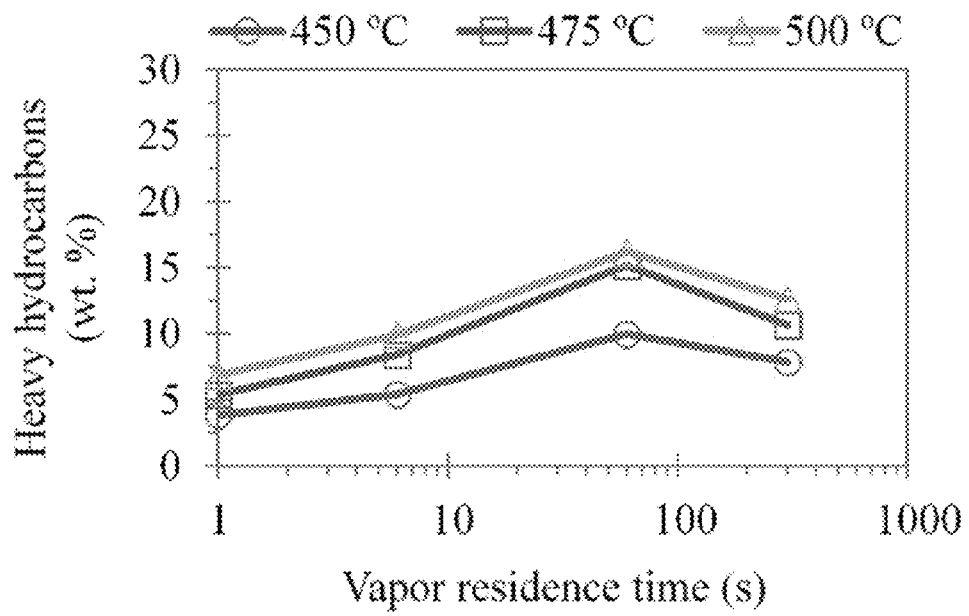
Figure 5D:
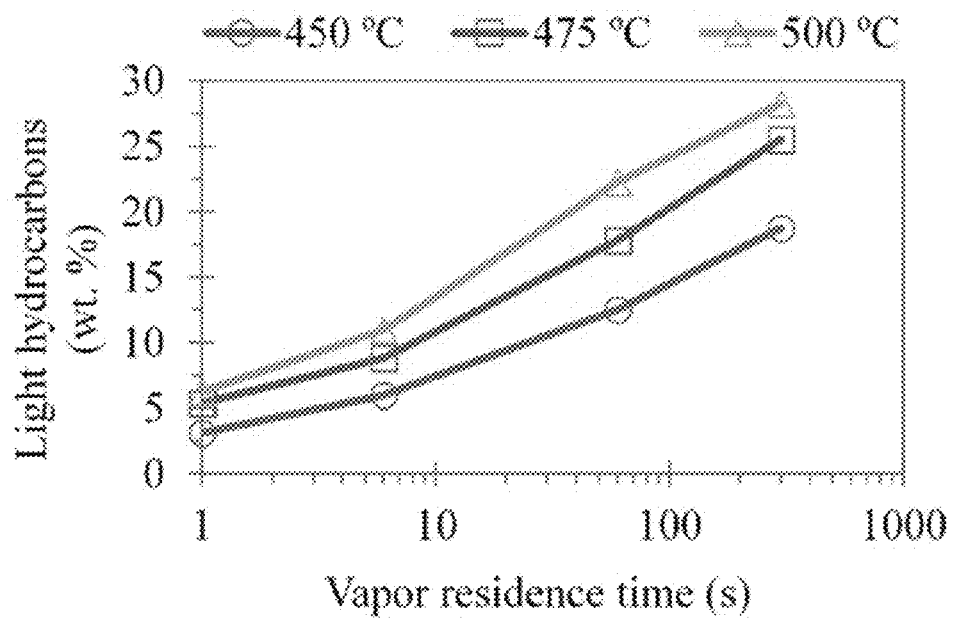

Product composition from pyrolysis reactions were estimated by GC analysis of the recovered liquid. FIGS. 5A-5D show the content of L-FAs (C16-C18; FIG. 5A), S-FAs (C6-C11; FIG. 5B), Hy-HCs (>C12; FIG. 5C), and Lt-HCs (C5-C12; FIG. 5D) in the recovered liquids. Identification and quantification of hydrocarbons (heavy and light), and L-FAs were relatively straightforward. Concentrations of these components were estimated from GC-FID peak areas by comparison with calibration curves of known standards. However, direct identification and quantification of S-FAs was more difficult because these compounds showed low sensitivity on both GC-FID and GC-MS. Therefore, derivatization of fatty acids to fatty acid methyl esters (FAMEs) was performed to improve sensitivity. Even after derivatization, identification and quantification of S-FA methyl esters was difficult using GC-FID, because of close peak proximity with Lt-HCs. GC-MS, however allowed a positive identification of the S-FAs methyl esters. Therefore, S-FAs were quantified by GC-MS by comparison of peak areas with calibration curves of S-FA methyl ester standards.

From FIGS. 5A-5D, it is seen that the concentrations of L-FAs (FIG. 5A) in the products first increased (1 s<$\tau$<6 s), and then decreased ($\tau$>6 s). At $\tau$<6 s, the conversion of triglycerides is incomplete (refer to FIG. 3A) and L-FAs (that formed from triglycerides degradation) likely further decompose to only a small extent due to the short residence time. In other words, the rate of formation of L-FAs is higher than the rates of their decomposition when $\tau$<6 s. For instance, at 450° C. and $\tau$=1 s, although only ~28% of non-glyceride liquid products were formed, the L-FA fraction of the non-glyceride liquid products was nearly 70%. However, after 6 s, when nearly complete triglyceride conversion was achieved (FIG. 3A), the produced L-FAs would be expected to decompose via reactions 3 and/or 4 (FIG. 4), when allowed to stay in the reactor longer. Thus, the L-FAs concentrations decreased when $\tau$>6 s (FIG. 5A). Interestingly, oleic acid remained the major fatty acid component of the L-FA fraction, while linoleic acid was only 5% of the total recovered liquid (Table 1, FIG. 7). In contrast, the feed contained ~50% linoleic and linolenic acids. The enrichment of oleic acid in the pyrolysis products indicates that linoleic acid (C18:2) and linolenic acid (C18:3) break down more readily than oleic acid (C18:1).

From FIG. 5B, it can be observed that S-FA concentrations increased consistently with vapor residence time. Fatty acid chains in soybean oil are largely polyunsaturated (linoleic and linolenic acid) and prone to C=C cleavage. These decompositions generally result in formation of S—FAs and Lt-HCs (FIGS. 3A-3C). Table 2 (FIG. 8) shows the composition of S-FAs in the recovered liquid. From these data, it can be observed that the majority of the produced S-FAs were saturated (such as hexanoic, heptanoic, octanoic, nonanoic, and decanoic acid). In addition, the yields of nearly all S-FAs increased at higher vapor residence time and reaction temperature most likely because the cleavage of C=C bond is an endothermic reaction. Since fatty acid chains in the parent triglyceride are predominantly unsaturated, it is believed these FAs were produced by C=C cleavage. For instance, oleic acid contains one double bond at $C_9$ and linoleic acid has an additional double bond at $C_{12}$. Cleavage of the C=C double bond (from L-FAs) at the $\alpha$, $\beta$ position relative to the $C_9$ unsaturation would produce heptanoic acid, and similar cleavage relative to $C_{12}$ would produce decenoic acid. Thereafter, hydrogenation of decenoic acid (due to hydrogen generation from glycerol decomposition) could form decanoic acid. Heptanoic, decanoic, and decenoic acid were the major S-FAs compounds observed in the products.

As observed in FIG. 5C, the concentrations of Hy-HCs in liquid products also increased at 1 s<$\tau$<60 s, but decreased at higher reaction times. These $C_{12}$ and higher hydrocarbons were likely produced from decarboxylation and/or decarbonylation of L-FAs along with partial cracking of the fatty acid chain. The Hy-HCs that have unsaturated C—C bonds can break down and produce Lt-HCs. Like S-FAs, the content of Lt-HCs increased with $\tau$ and T. Formation of Lt-HCs is thermodynamically more favored at higher T due to the endothermicity of cracking (C=C cleavage) and decarboxylation reactions. Table 3 (FIG. 9) shows the mass of the identified and unidentified chemical compounds in the recovered liquid as a fraction of feed mass. Production of non-condensable gases (such as $C_1$-$C_4$ hydrocarbons, $H_2$, $CO_2$, and CO) was calculated by subtracting liquid product mass from feed mass. The mass of unidentified components was then calculated by subtracting the identified liquid products and uncondensed gases from feed mass. From Table 3 (FIG. 9), it can be seen that at $\tau$=1 s, nearly all liquid products were identified.

However, for experiments at higher $\tau$ identification of all products was difficult, due to the vast number of small peaks that were present on the GC-FID chromatogram. Between 10-25% of the products remained unidentified in the recovered liquid with higher $\tau$. Other studies have also reported similar mass closure of identifiable products (typically 30-80%). At higher $\tau$, secondary reactions are enhanced and the concentrations of Lt-HCs increased. These Lt-HCs consisted of several components. For instance, the detailed results of hydrocarbons identification showed 360 distinct peaks on the GC-FID chromatogram. Although each unidentified compound was likely produced at a low concentration, the cumulative effect is significant. A majority of the unidentified products were in the range of Lt-HCs (GC column elution temperature <90° C.). To assess the products at an extreme reaction condition, soybean oil was pyrolyzed at 550° C. and $\tau$=300 s. Under this severe reaction condition, liquid products likely underwent extensive cracking to small molecules which resulted in a high (50%) production of uncondensed gases (Table 3, FIG. 9). The high content of Lt-HCs (23.1% of feed) under these conditions is likely due to break down of unsaturated Hy-HCs, decarboxylation of S-FAs, and degradation of L-FAs. As a result, low mass of fatty acids (long- and short-chain) as well as Hy-HCs was observed.

Product Distillation and Detailed Hydrocarbon Analysis

Figure 10:
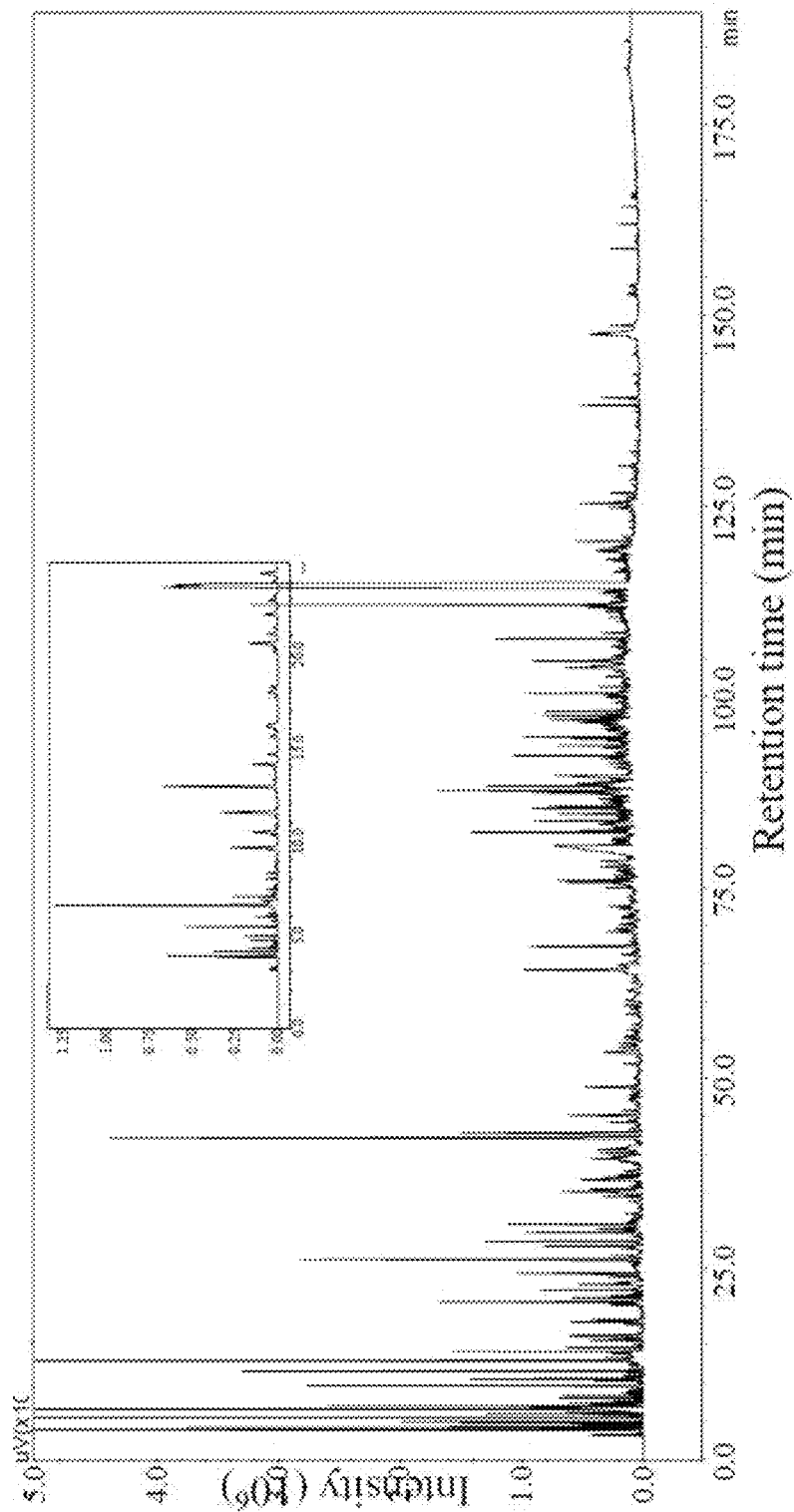
FIG. 10: GC-FID analysis of distilled fraction.

Products of soybean oil pyrolysis at T=500° C. and $\tau$=60 s were distilled to separate free fatty acids from hydrocarbons, since a high yield of non-glyceride liquid products (~85%; FIG. 3C) was achieved at these experimental conditions. Distillation was performed under vacuum (60 mm Hg) to minimize thermal degradation (if any) of liquids during the separation. The goal of distillation was to separate L-FAs from other components. To estimate the appropriate distillation temperature, boiling point (b.p.) of hydrocarbons and fatty acids were estimated at the vacuum conditions employed. The b.p. of heptadecane (highest carbon-number hydrocarbon in the liquid products) at 60 mm Hg was estimate to be 200° C. from extrapolation of its normal b.p. For fatty acids, the b.p. values at 10 mm Hg were extrapolated to a pressure of 60 mm Hg. From these correlations, the b.p. of oleic and palmitic acid were estimated to be 271 and 261° C., respectively. Since there was sufficient difference in b.p.s of hydrocarbons and L-FAs at 60 mm Hg, vacuum distillation was performed at 200° C. Vacuum distillation was carried out for 4.5 h (including 1.5 h for heating up to distillation temperature). After 4.5 h, no further boiling of the liquid phase was visually apparent. Thereafter, the distilled fraction (DF) and the residue fraction (RF) were analyzed using GC-FID. FIG. 10 shows the GC-FID chromatogram of the DF. Identification of compounds was performed by matching retention time of analytes with standard mixtures (listed in the materials section) and was confirmed by GC-MS through a comparison of MS spectra of analytes with corresponding entries from the NIST 2008 database. The GC-FID analysis identified 360 peaks with relative concentration above 0.01% in the distilled fraction. Since quantification of all individual compounds using their corresponding standards is difficult, chemicals were quantified using relative peak areas.

Table 4 (FIG. 11) shows the more abundant compounds (with concentrations approximately above 0.1%) that represent nearly 85% of the DF. As observed, different classes of hydrocarbons were present in the products. Light hydrocarbons in the range of gasoline ($C_5$-$C_{12}$) comprise almost 65% of the DF. The major compounds identified are $C_5$-$C_{17}$ alkanes and alkenes, aromatics including benzene, toluene, ethylbenzene, propylbenzene, buthylbenzene, and xylene, and cyclic compounds such as cyclooctane and cyclopentane methylene. Table 5 shows the relative mass of aromatics, olefins, paraffin and cyclic compounds in the DF.

TABLE 5

Relative mass of different classes of compounds in the distilled fraction

| Classes | Wt. (%) |
|---|---|
| Paraffin ($C_5$-$C_{17}$) | 22.9 |
| Olefin ($C_5$-$C_{17}$) | 32.1 |
| Aromatic | 13.0 |
| Cyclic compounds | 8.9 |
| Dienes | 8.5 |
| Unidentified | 14.6 |
| Total | 100 |

While aromatic compounds improve the octane number of a fuel, their use in gasoline is strictly regulated by EPA air quality standards. The DF contains 13% aromatic, which is below the regulated value (maximum 20%). Formation of aromatics can occur due to Diels-Alder reaction and/or intramolecular radical cyclization. In a Diels-Alder reaction, a diene and an alkene react and form polysubstituted cyclohexenes, and then via hydrogenation polysubstituted cyclohexanes, and via dehydrogenation polysubstituted aromatic products. It can also be noted that majority of olefins and paraffins are unbranched. Dienes (e.g. undecadiene, tridecadiene, and tetradecadiene) were also present in the DF.

Figure 12:
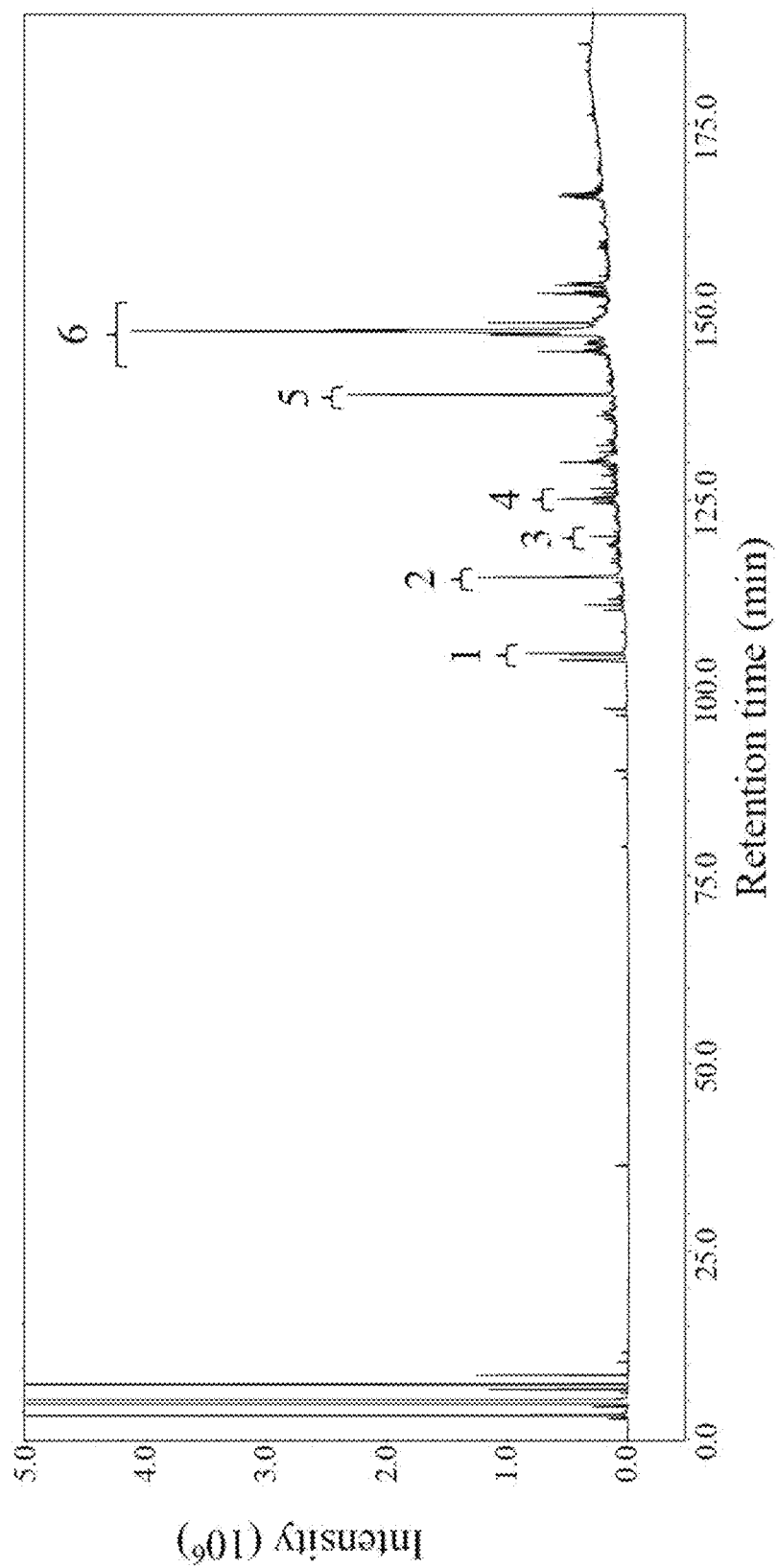
FIG. 12: GC-FID chromatogram of residue fraction.

FIG. 12 shows the GC-FID chromatogram and Table 6 (FIG. 13) shows the composition of residual fraction (RF) of the distillation. It can be clearly seen that $C_{18}$ fatty acids were the major (59%) components of the RF. In addition, much smaller amounts of $C_{16}$ fatty acids, and $C_{13}$-$C_{17}$ hydrocarbons were also observed in the RF. In contrast with GC-FID results of the DF (FIG. 10), the analysis of the RF (FIG. 12) showed no significant peak prior to a retention time of 100 min. This indicates that the simple distillation (that was used in the experiment) could separate most hydrocarbons from L-FAs. Although the RF contained small amounts of $C_{13}$-$C_{17}$ hydrocarbons (~11%), with a better control of distillation conditions, more purified L-FAs could possibly be recovered.

Figure 14A:
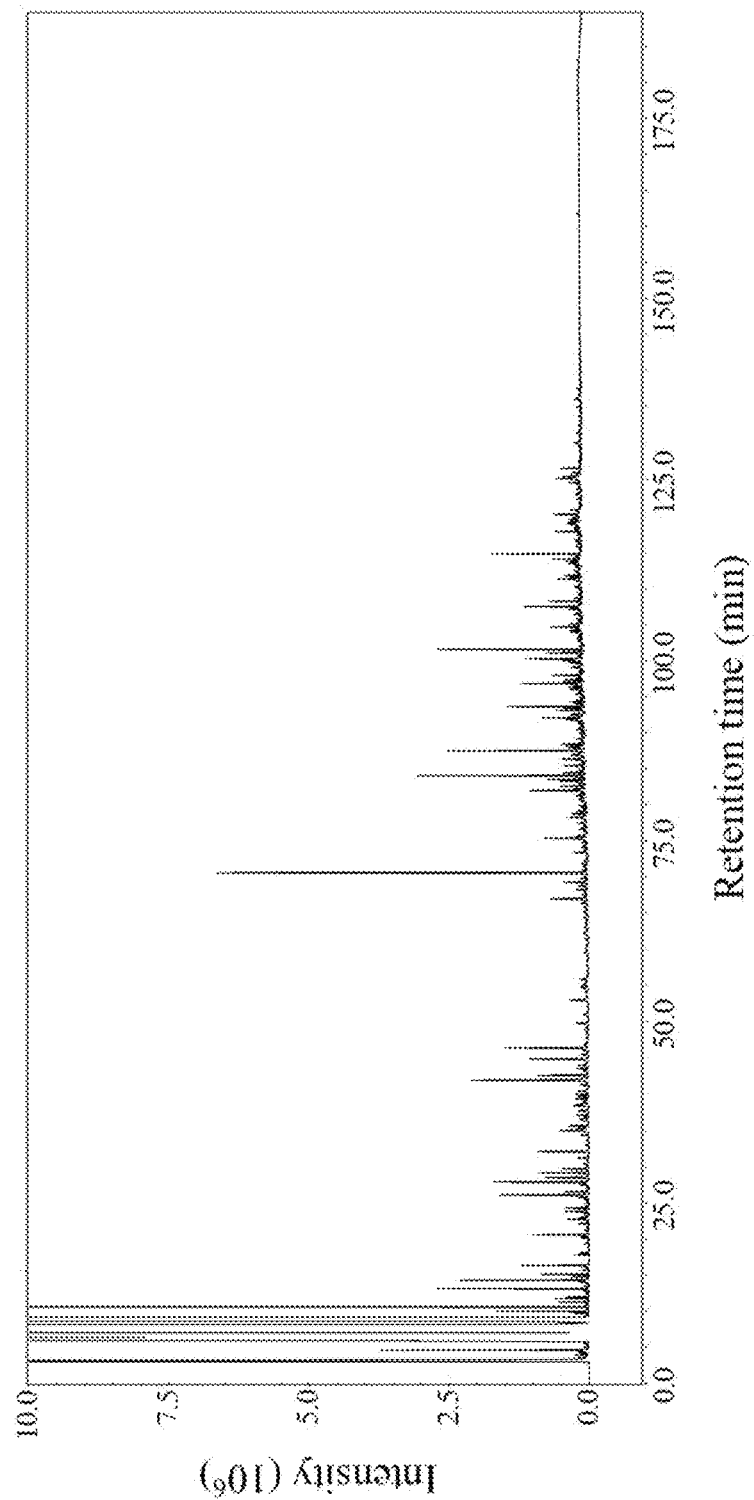
FIGS. 14A-14B: GC-FID analysis of derivatized DF (FIG. 14A) and RF (FIG. 14B).
Figure 14B:
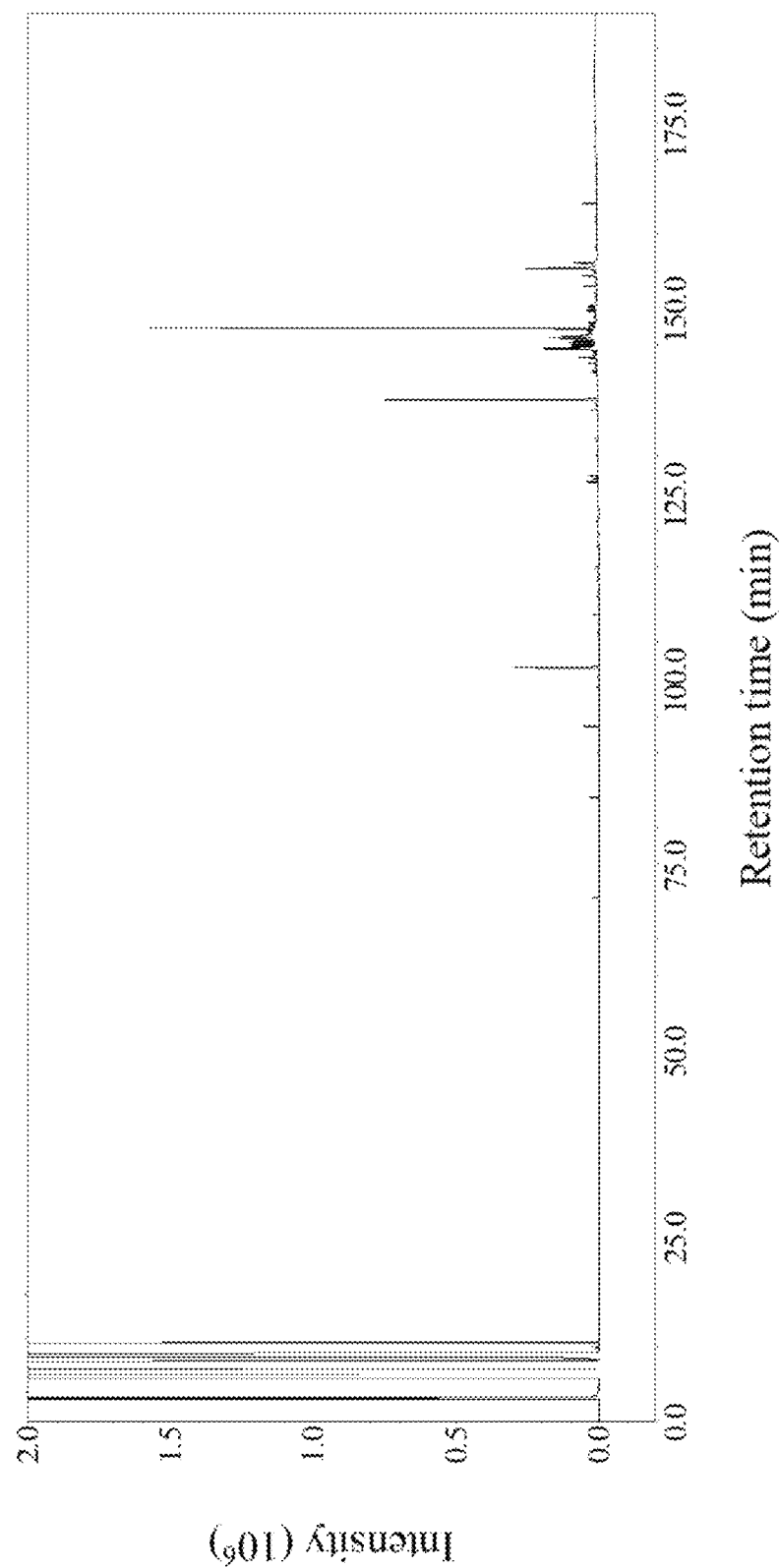

S-FAs in the DF and RF were identified and quantified separately since derivatization of S-FAs was needed to improve the sensitivity of detection by GC-FID. The procedure for derivatization was similar to transesterification of soybean oil, which is explained above. Derivatized S-FAs were quantified by comparison with FID response of known methyl ester standards. FIGS. 14A-14B show the GC-FID chromatogram of the derivatized DF and RF. The composition of S-FAs in DF and RF is given in Table 7 (FIG. 15). From these data, S-FAs comprised ~7% of the DF with heptanoic acid (C7-FAs) as the major S-FAs. Also, S-FAs (mainly C10-FAs) comprised ~9% of the RF. It is important to mention that the GC-FID analysis of the DF (FIG. 14A) did not show any peak corresponding to L-FAs. This indicates that all L-FAs (of the liquid products at experiment 500-60) remained in the RF.

The distillation results show that pyrolysis products could be relatively easily separated into hydrocarbon-rich and L-FA-rich fractions. The hydrocarbon-containing fraction could then be converted to fuels or further distilled to recover aromatics.

Example 2: Isolating Oleic Acid from Soy Oil Via Pyrolysis

Figure 16:
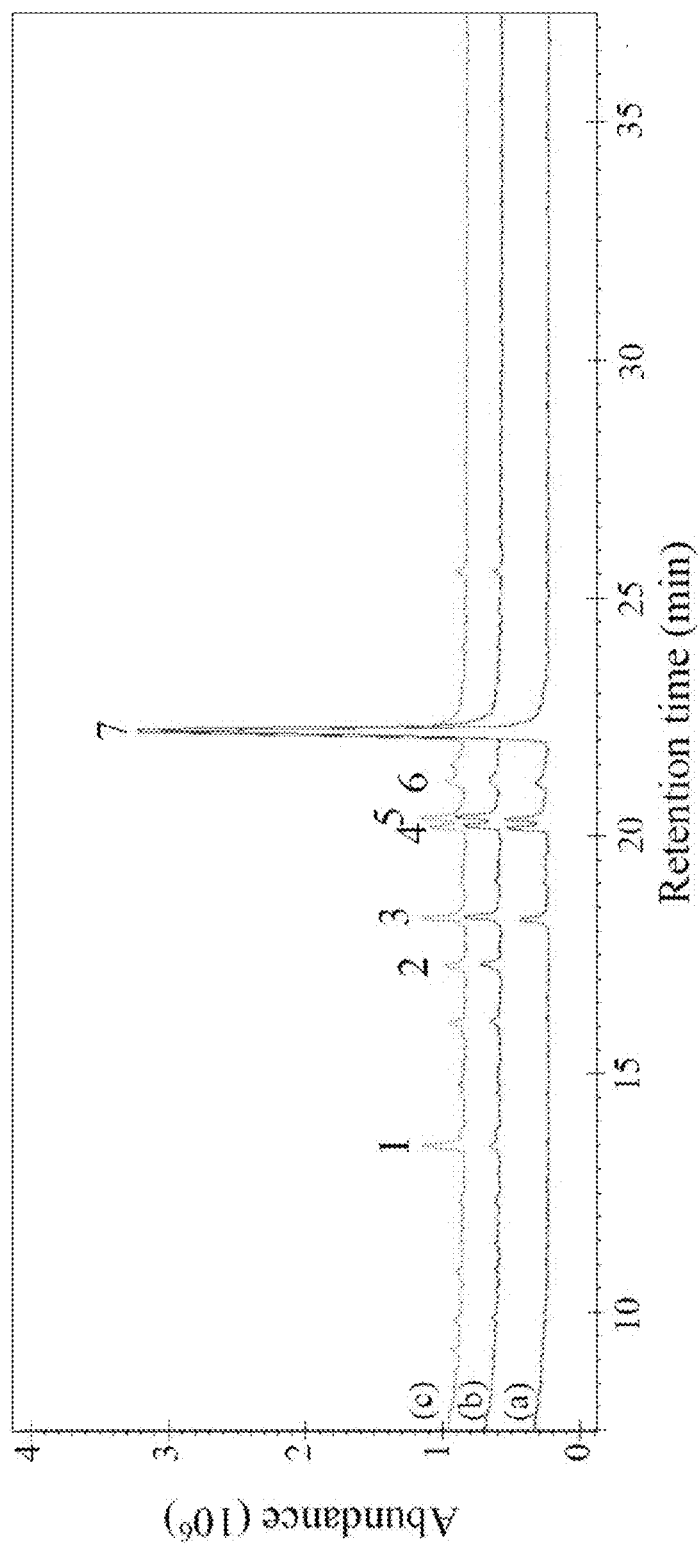
FIG. 16: GC-MS analysis of oleic acid pyrolysis: feed (a, red), and pyrolysis products at 450° C. and τvap of 60 s (b, green) and 300 s (c, yellow).

Analysis of products from vegetable oil pyrolysis indicated that oleic acid was relatively thermally-stable (Table 1, FIG. 7). To better understand the thermal degradation of the monounsaturated oleic acid under more controlled conditions (in the absence of other poly-unsaturated fatty acids), pyrolysis of enriched oleic acid was performed. The experimental set-up was kept similar to pyrolysis of soybean oil in order to compare the results of oleic acid and soybean oil pyrolysis. The feed contained small amounts of saturated fatty acids-C16:0 (~4%), C14:0 (~3%) and C17:0 (~2%); oleic acid was ~85% of the feed. Pyrolysis was carried out at 450° C. and τ of 60 s and 300 s (conditions that showed low degradation of oleic acid during soybean oil pyrolysis). Identification of feed and pyrolysis products was performed using GC-MS, and quantification of components was carried out via GC-FID. FIG. 16 shows the GC-MS chromatogram of feed (FIG. 16, line (a)), and pyrolysis products at 450° C. and τ of 60 s (FIG. 16, line (b)) and 300 s (FIG. 16, line (c)). Product composition at 450° C. and τ=60 s is nearly same as the feed (Table 8, FIG. 17), which indicates that the extent of degradation was small under these conditions. The heptadecene (2.9%) was likely produced due to decarboxylation of oleic acid. Even at τ=300 s, a large portion of the pyrolysis products was still oleic acid (~63%), and only ~4.3% decanoic acid (due to C—C cleavage) was observed in addition to heptadecene (5.7%). Overall, pyrolysis results of oleic acid demonstrate that oleic acid is thermally stable and can be largely recovered in its native fatty acid form after pyrolysis. In contrast, poly-unsaturated fatty acids are much more thermally labile and undergo extensive degradation, as evidenced by the low concentration of these in the products of soybean oil pyrolysis (Table 1, FIG. 7). Oleic acid is an important precursor in oleochemicals, and these results indicate that pyrolysis can be used for high yield recovery of this fatty acid from oleic acid-rich feedstocks such as sunflower oil.

Example 3: Catalytic Pyrolysis of Vegetable Oil

Figure 18:
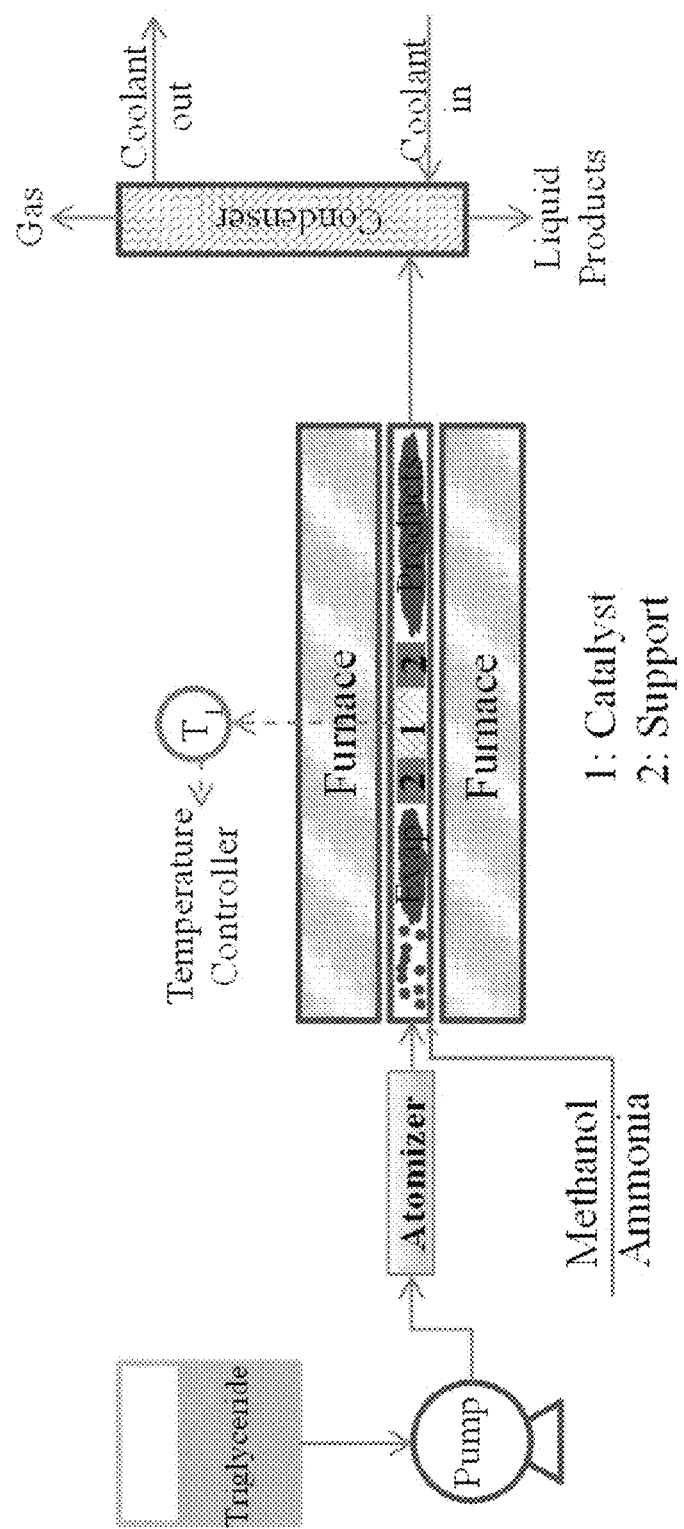
FIG. 18: Color schematic diagram of the continuous-flow catalytic pyrolysis reactor used in the Examples described herein.

Overall, the results from pyrolysis (without catalyst) of vegetable oil showed high yield of liquid products composed of hydrocarbons mixtures and fatty acids. Moreover, fractional distillation can separate gasoline, jet fuel, diesel, and fatty acids fractions from liquid products. Pyrolysis in the presence of a catalyst (catalytic pyrolysis) can selectively produce aromatics (in particular $C_7$-$C_9$) that are important to improve octane number of gasoline and jet fuel. Among various pyrolysis catalysts, ZSM-5 is especially appropriate due to its crystallinity, well-defined pore structures, large surface area, strong acidity, and high resistance to deactivation. ZSM-5 is a highly shape selective catalyst, thus the molecules that are structurally larger than the pore size of the catalyst will decompose in order to accommodate within the pores. Therefore, $C_2$-$C_{10}$ olefins production followed by cyclization/aromatization and dehydrogenation reactions leads to formation of aromatics. The experimental setup described in Examples 1 and 2 was slightly modified for the catalytic pyrolysis experiments. A catalyst bed was included in the reactor as shown in FIG. 18, which also shows a means to introduce additional reactants (such as methanol or ammonia) into the pyrolysis reactor, if desired.

Product Yields

Figure 19:
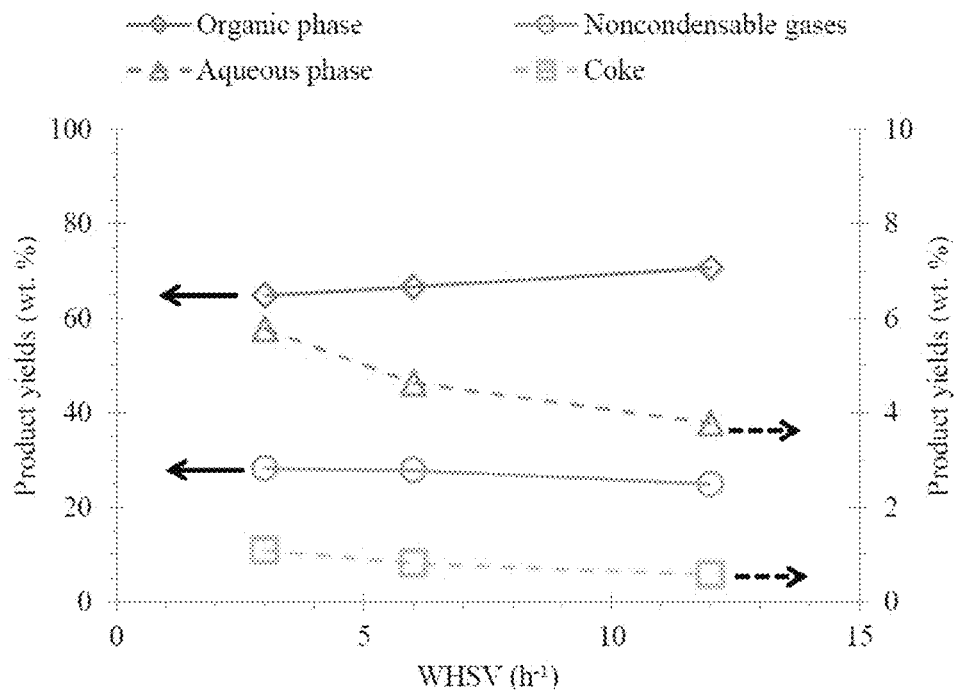
FIG. 19: Product yields of catalytic conversion of soybean oil at 500° C. versus WHSV.

FIG. 19 shows the mass fraction of the organic phase, aqueous phase, non-condensable gases, and coke produced from a series of catalytic pyrolysis experiments with ZSM-5. In these experiments, the weight hourly space velocity (WHSV) was varied between 12 $h^{-1}$ and 3 $h^{-1}$. The reaction temperature was maintained at 500° C. and 5 g of ZSM-5 was used for each experiment. The desired WHSV was achieved by adjusting the feed mass flowrates. From FIG. 19, one can observe that yield of organic phase decreased slightly from 71% to 65% when WHSV decreased from 12 $h^{-1}$ to 3 $h^{-1}$. This can be attributed to greater cracking activity when contact time between feed and catalyst was longer. hi contrast, aqueous phase yield increased due to more dehydration of the oxygenated fatty acids. Interestingly, coke deposit on the catalyst was only ~1%. This indicates polyaromatization and hydrogen transfer reactions were very low (or absent). Low coke formation increases the catalyst life time and decreases the extent of catalyst deactivation.

Products Analysis

Figure 20:
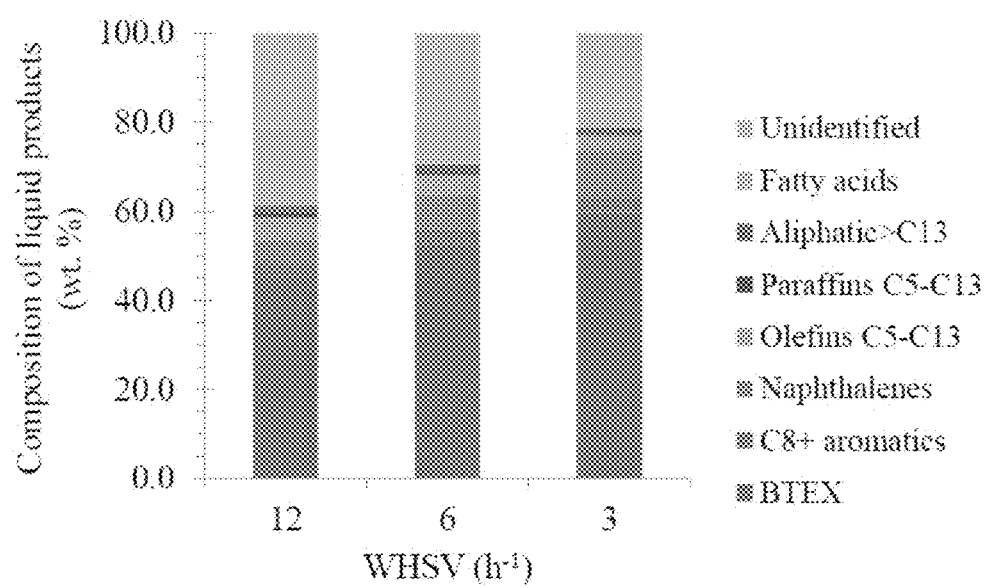
FIG. 20: Composition of organic phase from catalytic cracking of vegetable oil at 500° C.

FIG. 20 shows the compositions of the organic phases from catalytic pyrolysis experiments with soybean oil at 500° C. As can be seen, the organic phase mainly consisted of aromatics (in particular, benzene, toluene, ethylbenzene, and xylene); the relative content of aromatics was higher when WHSV was lower. Formation of aromatics can occur due to Diels-Alder reactions and/or intramolecular radical cyclizations. Furthermore, strong Brønsted acid sites in the ZSM-5 enable the oligomerization of light olefins to form $C_4$-$C_{10}$ olefins which then dehydrogenate to form dienes. Thereafter, dienes and olefins undergo cyclization and dehydrogenation to form aromatics. At WHSV of 3 $h^{-1}$, the organic phase was composed of 60% BTEX compounds (benzene, toluene, ethylbenzene, and xylene), which are desirable in the petrochemical industry.

Distillation of Liquid Products

Figure 21:
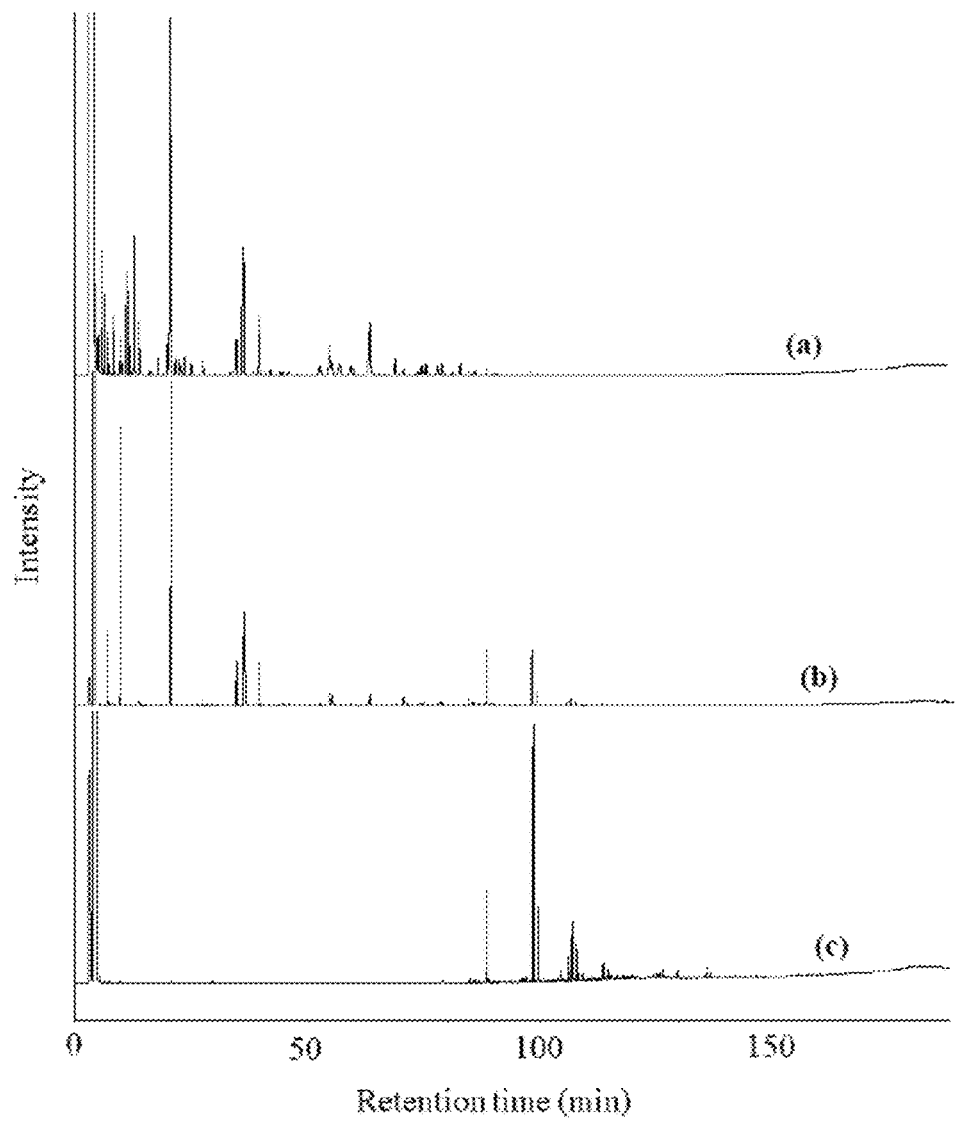
FIG. 21: GC-FID chromatogram of unleaded gasoline (a), DF (b), and RF (c).

Organic phases from the catalytic pyrolysis experiments (soybean oil at T=500° C. and WHSV of 3 $h^{-1}$) were distilled to separate gasoline/jet fuel range hydrocarbons from others (free fatty acids and naphthalene). Distillation was performed under vacuum (10 mm Hg) to minimize thermal degradation (if any) of liquids during the separation. The goal of the distillation was to separate gasoline/jet fuel fractions from other components. After distillation, the distilled fraction (DF) and residue fraction (RF) were analyzed using GC-FID. FIG. 21 shows the GC-FID chromatogram of unleaded gasoline standard, DF, and RF. As observed, there was no evidence of fatty acids in the DF, and most of naphthalene was collected in RF. These results indicate that the DF is similar to gasoline. Moreover, fractional distillation results in isolation of alkyl-benzenes, which are desirable aromatic compounds for jet fuel.

Example 4: Catalytic Pyrolysis of Waste/Non-Edible Vegetable Oil

Catalytic pyrolysis of the triglycerides showed that high BTX (benzene, toluene, and xylene) aromatic yields were achieved using the pyrolysis system. In this example, non-edible and/or waste vegetable oil was used as feed to assess the catalytic pyrolysis performance. Further, since catalysts can deactivate during pyrolysis due to coke formation, the deactivated catalysts were regenerated by combusting the catalyst in presence of oxygen, and the catalyst was reused to assess the long-term reusability of the catalyst and performance of the regenerated catalyst. The reaction-regeneration cycle was performed for at least 10 times and the products yields and compositions of each cycle were analyzed and are shown FIGS. 24A-24B. Thereafter, the liquid products collected from all cycles were distilled to separate BTX from other aromatics and chemicals in the liquid products.

Figure 24A:
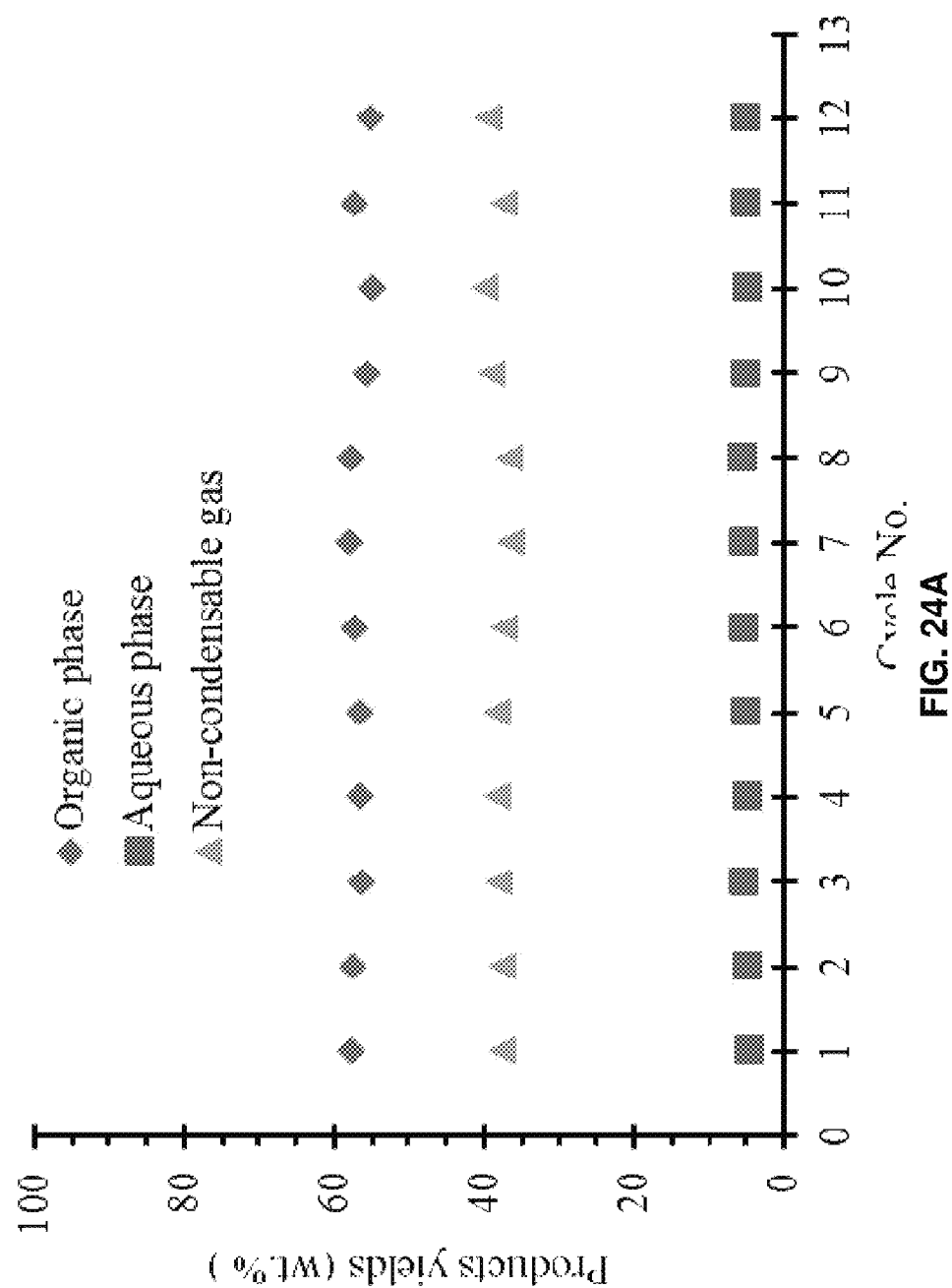
FIGS. 24A-24B: Results from catalytic pyrolysis of waste cooking oil.
Figure 24B:
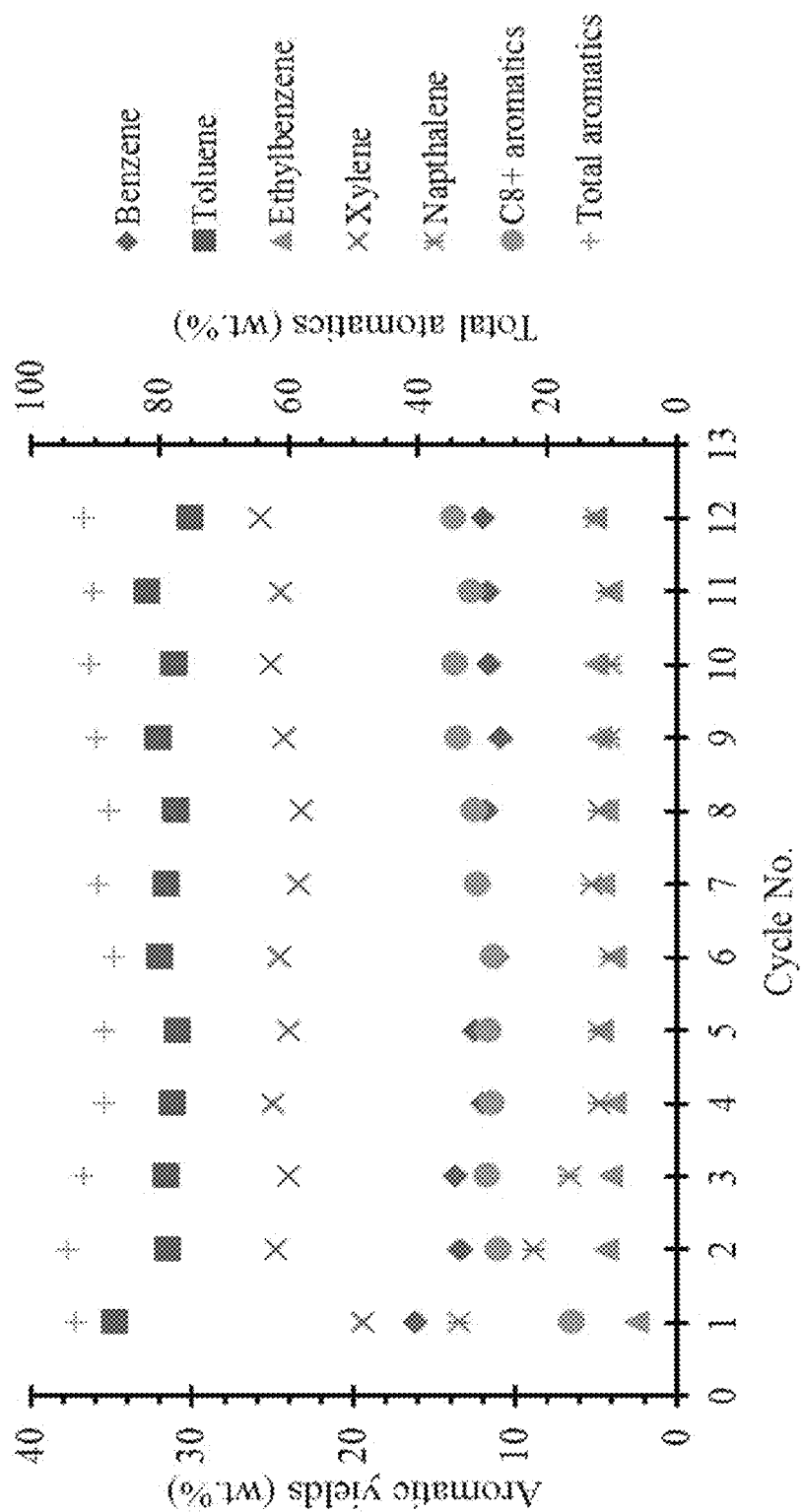
Figure 25:
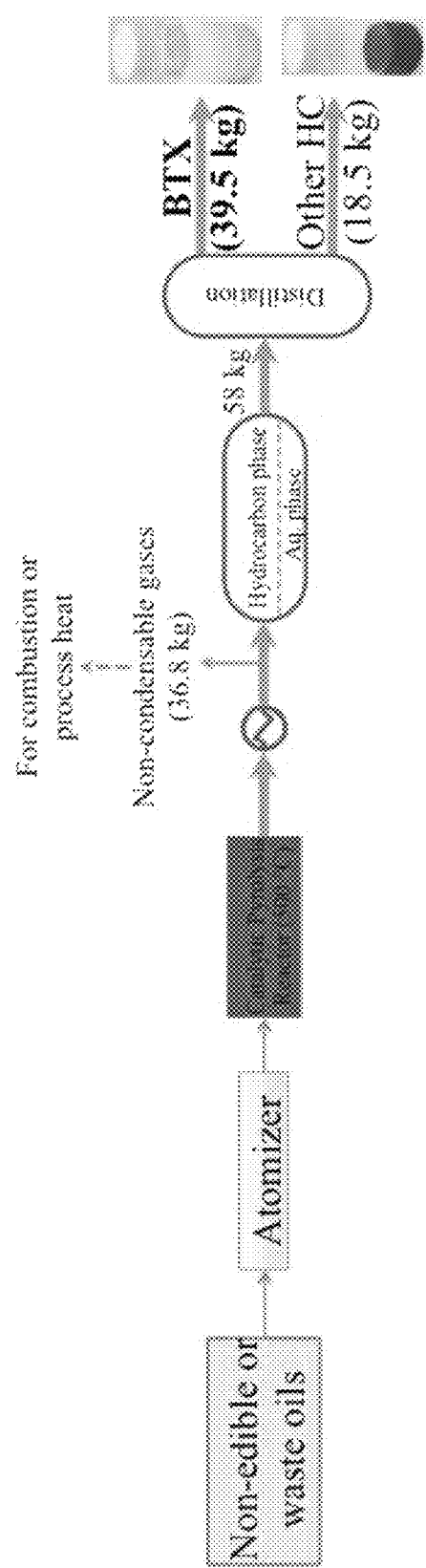
FIG. 25: Schematic diagram of catalytic pyrolysis of the waste cooking to separate BTX from other hydrocarbons in the liquid products. The figure also shows the yield of various products obtained.

As observed from FIG. 24A, nearly 60% of the feedstock was recovered as liquid products. The liquid products contained more than 90% aromatic chemicals such as benzene, toluene, xylene, and alkyl benzene. Moreover, most of the xylene produced in the liquid products was p-xylene, which can be used as precursor to produce polyethylene terephthalate (PET). Benzene was also used as a precursor for styrene, phenol, nylon, and aniline production; and toluene can be blended into unleaded gasoline to improve the octane number. The pyrolysis products yields and compositions from each cycle are similar. This indicates that catalysts can be regenerated and reused several times with little (if any) negative impacts on the pyrolysis products. FIG. 25 shows the distillation products and mass of each distillation fractions from catalytic pyrolysis of waste cooking oil. Nearly 40% BTX relative to the feed mass was produced. The BTX mixture had a clear and transparent color and high purity that can be used directly in petrochemical industries.

Example 5: Nitrile Production from Vegetable Oil

Figure 26:
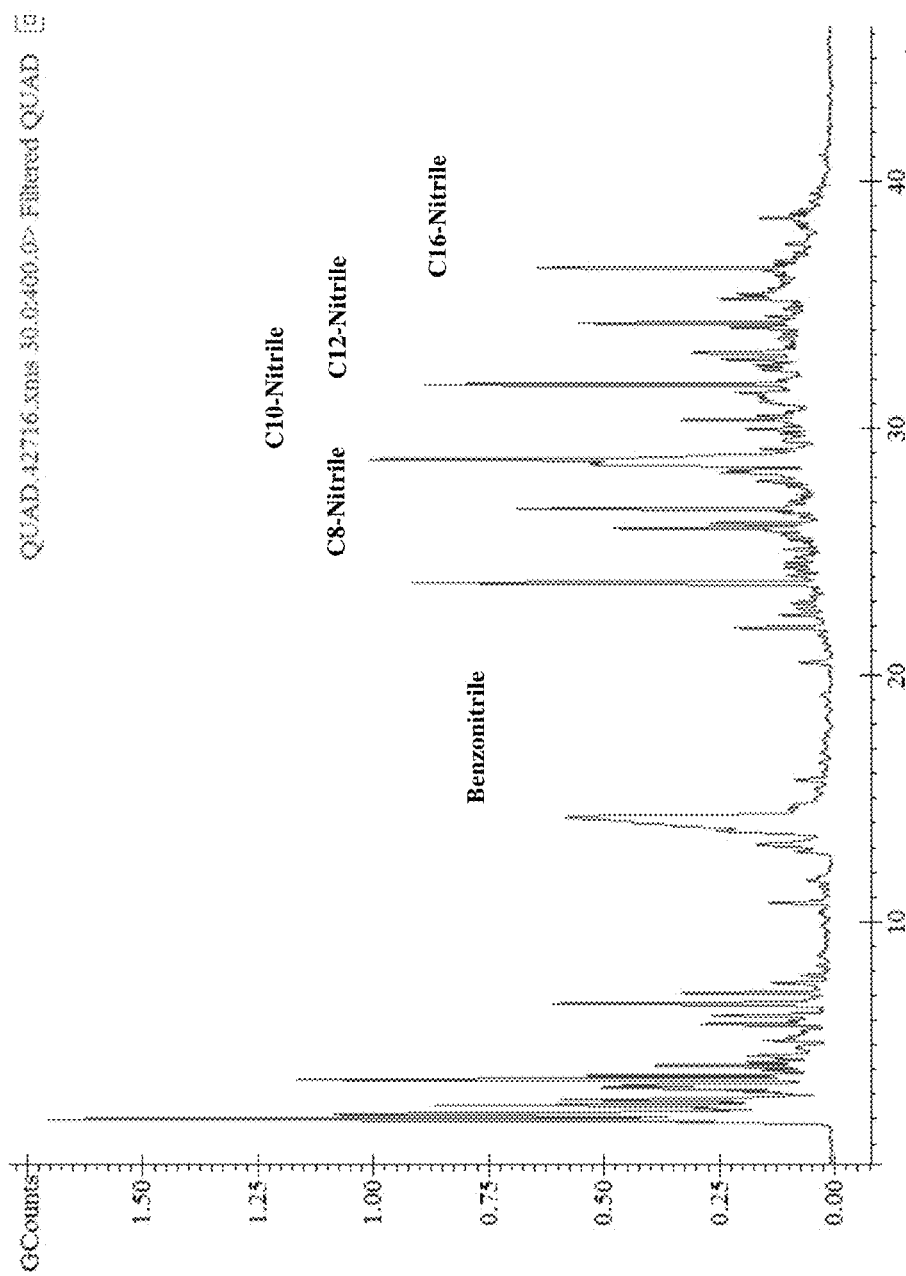
FIG. 26: GC-MS chromatogram of products from pyrolytic reaction of ammonia with soybean oil. The reaction produces fatty nitriles.
Figure 27:
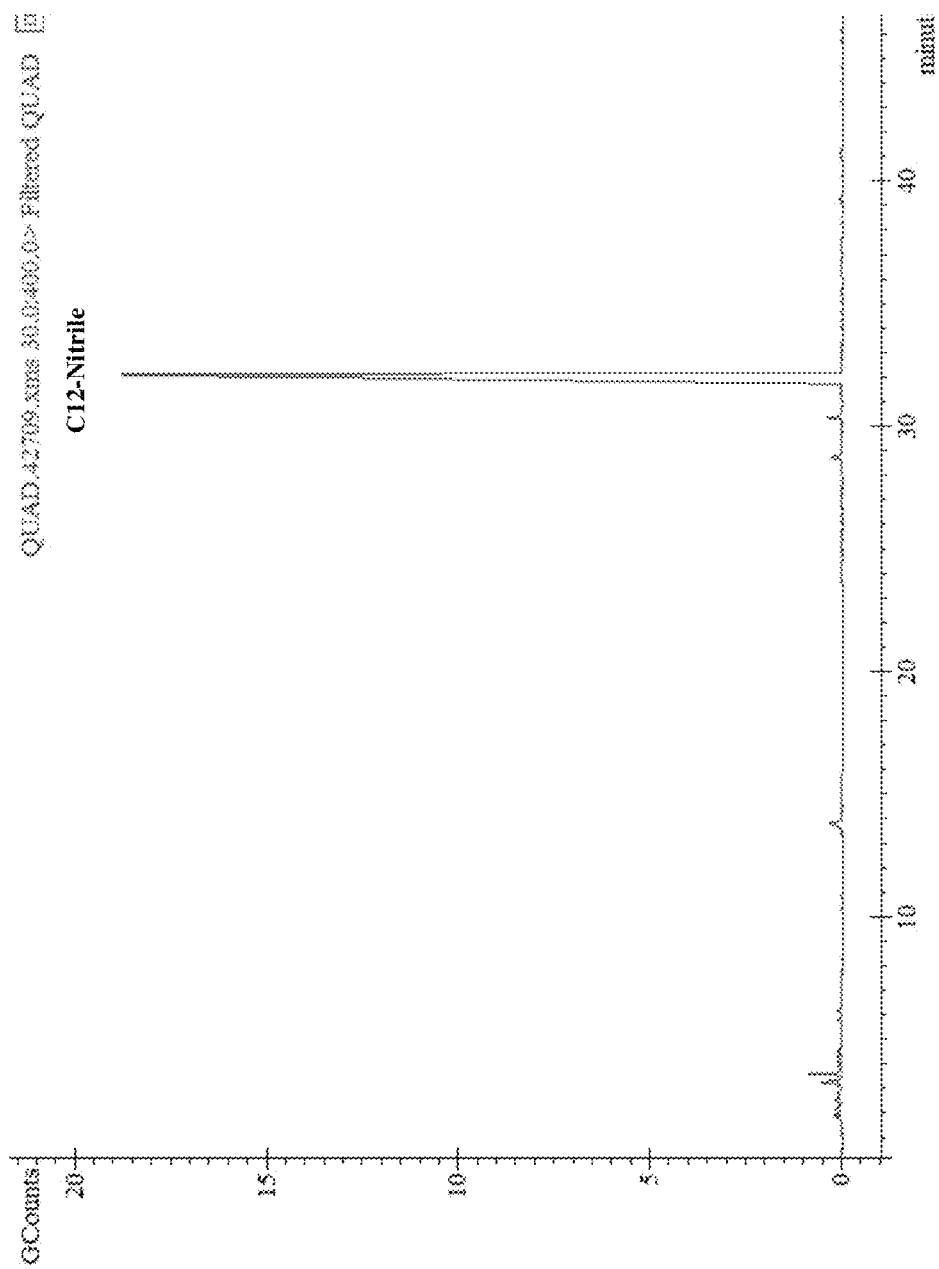
FIG. 27: GC-MS chromatogram of products from pyrolytic reaction of ammonia with lauric acid. The reaction produces lauronitrile.

N-containing chemicals are widely used in the pharmaceutical and polymer industries. In traditional practice, fatty nitriles are produced by the "Nitrile Process" in which ammonia is reacted with fatty acids in a liquid phase batch reactor. The product (fatty nitrile) is recovered at the end of the reaction. Typically the liquid phase reaction is slow and requires several hours to complete. Since product remains within the reactor throughout the batch operation, undesirable side reactions have been observed to occur, especially with the unsaturated fatty acids (e.g. oleic acid). In this example, results of tests performed to produce fatty nitriles by direct reaction of ammonia with vegetable oil pyrolysis vapors over a ZrO catalyst are described. The nitrilation reactions performed in this manner would allow for a "continuous process" for production of fatty nitriles (in contrast to the batch "Nitrile Process") and would also decrease the reaction time and improve the nitrile yield. In order to carry out the nitrilation reaction ammonia was introduced directly into the reactor via a separate line (see FIG. 18 and additional reactant source 30 shown in FIG. 1) to allow reaction with pyrolysis vapors in the presence of the metal oxide catalyst ZrO. FIG. 26 shows the GC-MS chromatogram of products from nitrilation reaction of soybean oil over ZrO and at 450° C. The liquid products were mainly comprised of fatty nitriles ($C_6$-$C_{16}$), benzonitrile, and some hydrocarbons such as hexene and toluene. Soybean oil is predominantly composed of unsaturated fatty acids, which tend to easily decompose (due to C=C cleavage) and produce short chain fatty nitriles. However, vegetable oils that contain higher fractions of saturated fatty acids such as coconut and babasu oil that have a high proportion of lauric acid (C12:0) would predominantly produce long chain (C12) fatty nitriles. FIG. 27 shows the GC-MS chromatogram of nitriles produced from nitrilation of lauric acid over ZrO. As observed, the product is predominantly (>97%) lauronitrile (C12 nitrile).

Figure 28A:
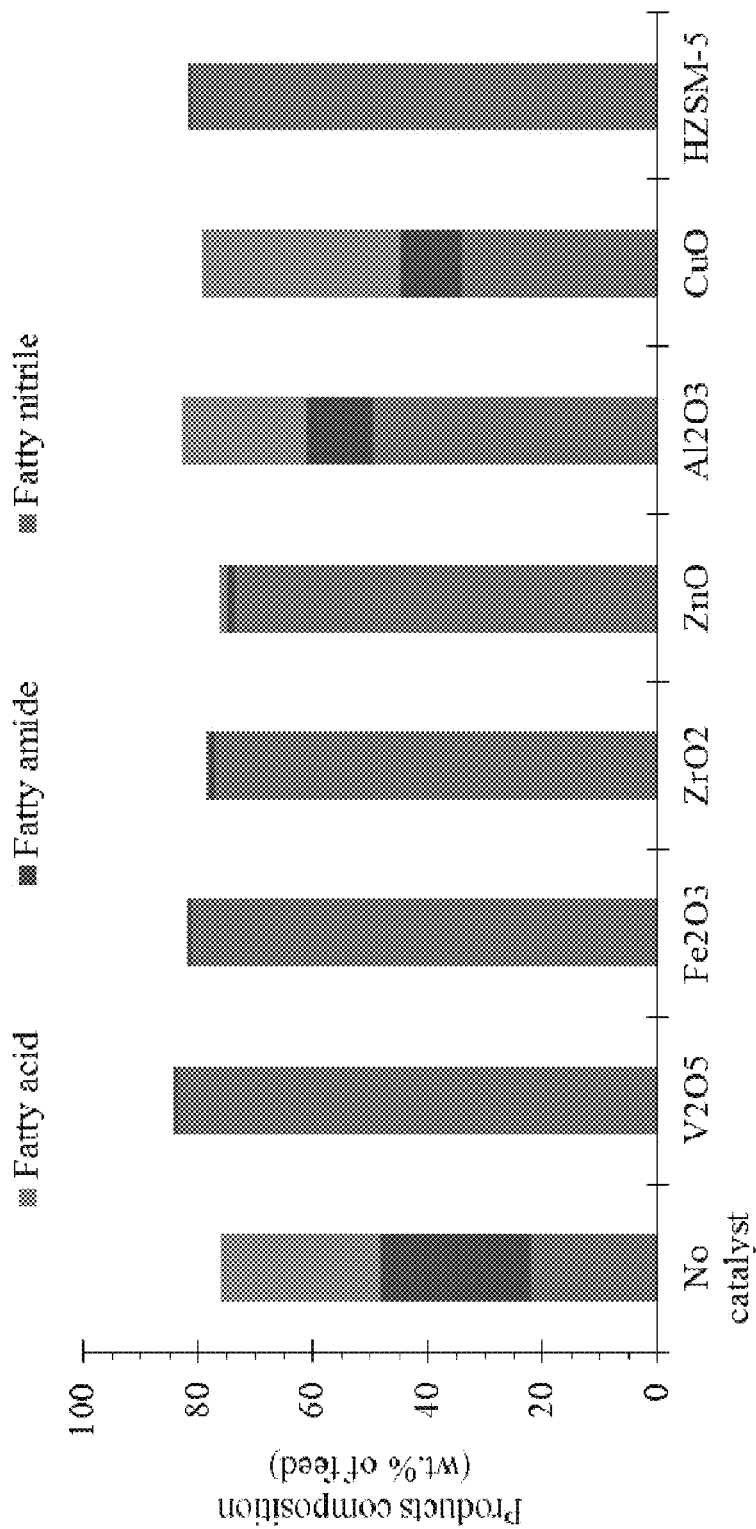
FIGS. 28A-28B: Product composition (FIG. 28A) and fatty nitriles selectivity (FIG. 28B) from one step vapor phase nitrile reaction over tested catalysts. C8-C18 represents the carbon numbers in fatty nitriles.

Example 6: High Yield Production of Fatty Nitriles from Coconut Oil Over Various Catalysts FIG. 28A shows the liquid products yields (relative to feed mass) from one step vapor phase nitrile reaction of coconut oil in the presence of the tested catalysts. For the reaction performed in the absence of catalysts, glass beads (1 mm OD) were packed (5 cm length) inside the reactor to maintain the same residence time (10 s) compared to the reaction in presence of the catalysts. The dashed line represents the theoretical maximum fatty nitriles yields, which was calculated to be approximately 86 wt. % relative to the feedstock.

From FIG. 28A, it can be seen that liquid product from one step vapor phase nitrile reaction in the absence of catalysts is composed of 28 wt. % fatty acids, 26 wt. % fatty amides, and only 22 wt. % fatty nitriles. However, the fatty nitriles yields significantly increased in the presence of catalysts due to more ammonization of triglyceride (or/and produced fatty acids) and dehydration of the fatty amides. Also, composition of liquid products varied using different catalysts. For example, near-quantitative yields of 84 wt. % fatty nitrile (relative to feed mass) was achieved from vapor phase nitrile reaction in presence of $V_2O_5$, which is nearly equal to the theoretical maximum. Moreover, high fatty nitriles yields (up to 81 wt. %) were obtained when HZSM-5 or $Fe_2O_3$ was used. The fatty nitrile yields in the presence of $ZrO_2$ and ZnO was lower—77% and 73%, respectively. Liquid products from $Al_2O_3$ contained only 50% fatty nitriles, 12% fatty amide, and 22% fatty acids. The fatty nitrile yields further decreased to 34 wt. % when CuO was used as catalyst.

Figure 28B:
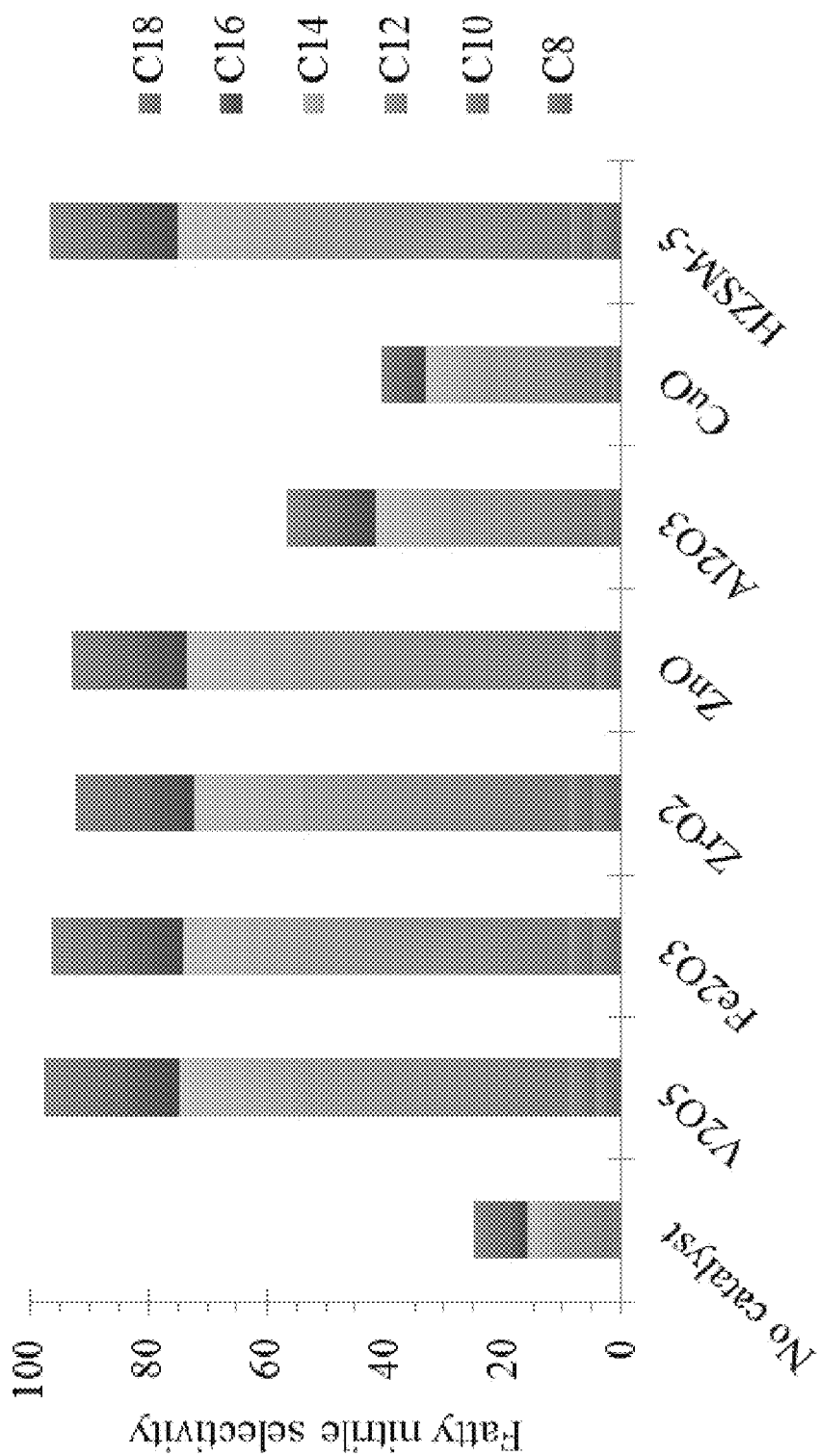

FIG. 28B shows the fatty nitriles compositions over tested catalysts. The products were $C_8$-$C_{18}$ fatty nitriles corresponded to the $C_8$-$C_{18}$ fatty acids present in coconut oil. From FIG. 28B, the fatty nitriles selectivity significantly increased in the presence of catalysts. For instance, $V_2O_5$ showed nearly 97% fatty nitriles selectivity. Of those, nearly 46% is lauric nitrile (C12-fatty nitrile). The fatty nitriles distribution in liquid products from $V_2O_5$ is nearly the same as coconut oil fatty acid composition. This indicates that polymerization and cracking reactions are minimized, likely due to short residence time and sufficiently low reaction temperature. Although the liquid product from $V_2O_5$ contains a mixture of fatty nitriles with different carbon chain length, they can be separated from the mixtures through a downstream distillation because of distinct boiling point differences.

CONCLUSIONS

In these examples, pyrolysis of soybean oil, vegetable oil, and coconut oil was performed to convert the feedstocks into fuels and chemicals. An atomizer was used to introduce the oil into the reactor in the form of micron-sized droplets to rapidly volatilize oil and achieve short vapor residence time. As a result, near theoretical yields of liquid products (up to 88% relative to feed mass) were achieved. The liquid products were composed of light- ($C_5$-$C_{12}$) and heavy- (>$C_{12}$) hydrocarbons in addition to short- ($C_6$-$C_{12}$) and long- ($C_{16}$-$C_{18}$) chain fatty acids. Distillation of liquid products resulted in distinct hydrocarbon-rich and long-chain fatty acids-rich fractions. The hydrocarbon-rich fraction contained paraffin (23%), olefin (32%), aromatic (13%), cyclic compounds (9%), and dienes (5%). In contrast with transesterification (which only produces biodiesel), pyrolysis can generate multiple fuels/fuel precursors (e.g. gasoline, jet fuel, and diesel) and chemicals (e.g. olefin and aromatics as primary petrochemicals; fatty acids for oleochemicals). Thus far, low yield of liquid products has remained an obstacle for commercialization of vegetable oil pyrolysis since feedstock price is the dominant cost for fuel production from triglycerides. These results, which demonstrate high yield of products, show that pyrolysis can be a viable alternative to transesterification for fuel production from vegetable oils.

These examples demonstrate that effective catalytic pyrolysis to aromatics-rich products can be achieved via the pyrolysis reactor. The method allows for in-situ reactions of the triglycerides to products at short residence time in a continuous process (example nitrilation of fatty acids).

Certain embodiments of the system, methods, and materials disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the compositions and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. A method of conducting a pyrolysis, the method comprising:
   atomizing an oil feedstock to produce atomized oil droplets, wherein the oil feedstock comprises vegetable oil, biooil, or biocrude;
   pyrolyzing the atomized oil droplets in a reactor with or without a catalyst to produce pyrolysis products, wherein the pyrolysis is conducted at a temperature ranging from about 400° C. to about 600° C.; and
   optionally, reacting the pyrolysis products in-situ with one or more added reactants to produce reacted pyrolysis products.

2. The method of claim 1, wherein the vegetable oil comprises soy bean oil, canola oil, corn oil, palm oil, palm kernel oil, mustard oil, grape seed oil, hazelnut oil, linseed oil, rice bran oil, sesame oil, safflower oil, carapa oil, guava oil, tall oil, camelina oil, babassu oil, pennycress oil, coconut oil, or mixtures thereof.

3. The method of claim 1, wherein the reactor and/or feedstock is pre-heated before the atomized oil droplets are introduced into the reactor.

4. The method of claim 1, further comprising subjecting the pyrolysis products and/or the reacted pyrolysis products to a separation, purification, and/or processing step.

5. The method of claim 1, further comprising distilling the pyrolysis products and/or the reacted pyrolysis products to produce one or more distillation products.

6. The method of claim 5, further comprising subjecting the one or more distillation products to an additional separation, purification, or processing step, wherein the additional separation, purification, or processing step is selected from the group consisting of a distillation process, an adsorption process, a filtration, a centrifugation, a crystallization, an extraction, an electrolysis process, an evaporation process, a hydrogenation process, an ozonolysis process, and an alkylation process.

7. The method of claim 1, wherein the catalyst comprises zeolites, metal oxides, solid acid catalysts, or solid base catalysts.

8. The method of claim 1, wherein the added reactants comprise ammonia, methanol, or hydrogen gas.

9. The method of claim 1, further comprising capturing and combusting gases escaping from the reactor for heat or power.

10. The method of claim 1, wherein no carrier gas is used.

11. The method of claim 5, wherein the distillation products include long chain fatty acids, and the method further comprises separating and collecting oleic acid, other monounsaturated fatty acids, and saturated fatty acids.

12. The method of claim 11, further comprising using the oleic acid and other monounsaturated fatty acids and saturated fatty acids as feedstock for oleochemical production.

13. The method of claim 5, wherein a catalyst is used, and the method comprises separating and collecting aromatic compounds.

14. The method of claim 13, further comprising producing jet fuel or petrochemical precursors from the collected aromatic compounds.

15. The method of claim 4, wherein at least one added reactant and the catalyst are used, and the method comprises collecting reacted products.

16. The method of claim 8, further comprising producing fatty nitriles, fatty amides, fatty acid methyl esters, and hydrogenated products.

17. The method of claim 1, wherein the atomized oil droplets are in the reactor for a residence time ranging from about 6 seconds to about 300 seconds.

* * * * *